(12) United States Patent
Mizutani et al.

(10) Patent No.: US 7,820,324 B2
(45) Date of Patent: Oct. 26, 2010

(54) ANODE ACTIVE MATERIAL AND BATTERY

(75) Inventors: Satoshi Mizutani, Fukushima (JP); Yoshihiro Kudo, Tokyo (JP)

(73) Assignee: Sony Corporation, Tokyo (JP)

( * ) Notice: Subject to any disclaimer, the term of this patent is extended or adjusted under 35 U.S.C. 154(b) by 1388 days.

(21) Appl. No.: 11/268,310

(22) Filed: Nov. 7, 2005

(65) Prior Publication Data
US 2006/0121348 A1 Jun. 8, 2006

(30) Foreign Application Priority Data
Nov. 9, 2004 (JP) ............................ P2004-325754

(51) Int. Cl.
*H01M 4/58* (2010.01)
(52) U.S. Cl. .............. 429/218.1; 429/231.8; 429/231.5; 429/128; 252/182.1; 252/518.1; 252/520.1; 252/520.2; 252/521.2; 252/521.5
(58) Field of Classification Search .............. 429/218.1, 429/231.8, 231.5, 128; 252/182.1, 518.1, 252/520.1, 520.2, 521.2, 521.5
See application file for complete search history.

(56) References Cited

U.S. PATENT DOCUMENTS

| | | | |
|---|---|---|---|
| 4,950,566 A | | 8/1990 | Huggins et al. |
| 5,541,017 A | * | 7/1996 | Hong et al. .................. 429/219 |
| 6,949,312 B1 | * | 9/2005 | Kawakami et al. ....... 429/218.1 |
| 7,229,717 B2 | * | 6/2007 | Yamaguchi et al. ...... 429/231.5 |

FOREIGN PATENT DOCUMENTS

| | | |
|---|---|---|
| JP | 08-315825 | 11/1996 |
| JP | 2005-158305 | 6/2005 |
| JP | 2006-107792 | 4/2006 |
| WO | WO 00/17948 | * 3/2000 |

OTHER PUBLICATIONS

Mao et al., "Mechanically Alloyed Sn-Fe(-C) Powders as Anode Materials for Li-Ion Batteries," Journal of the Electrochemical Society, 1999, vol. 146, No. 2, pp. 414-422.

Kim et al., "The Insertion Mechanism of Lithium into $Mg_2Si$ Anode Material for Li-Ion Batteries", Journal of The Electrochemical Society, 1999, vol. 146, No. 12, pp. 4401-4405.

* cited by examiner

*Primary Examiner*—Laura S Weiner
(74) *Attorney, Agent, or Firm*—K&L Gates LLP

(57) ABSTRACT

A battery with a high capacity and superior cycle characteristics and an anode active material used for it are provided. An anode contains an anode active material capable of reacting with lithium. The anode active material contains tin, cobalt, and carbon, and further contains at least one from the group consisting of indium, niobium, germanium, titanium, molybdenum, aluminum, phosphorus, and bismuth. Further, in the anode active material, the carbon content is from 9.9 wt % to 29.7 wt %, and the ratio of cobalt to the total of tin and cobalt is from 30 wt % to 70 wt %. Further, coordination number of cobalt as a first neighboring atom around tin obtained by the radial structure function calculated based on one scattering theory of X-ray absorption spectroscopy is 4 or less.

5 Claims, 11 Drawing Sheets

ANODE ACTIVE MATERIAL AND BATTERY

CROSS REFERENCES TO RELATED APPLICATIONS

The present application claims priority to Japanese Patent Application JP 2004-325754 filed in the Japanese Patent Office on Nov. 9, 2004, the entire contents of which is being incorporated herein by reference.

BACKGROUND

The present invention relates to an anode active material containing tin (Sn), cobalt (Co), and carbon (C) and a battery using it.

In recent years, many portable electronic devices such as a combination camera (Videotape Recorder), a mobile phone, and a notebook personal computer have been introduced, and downsizing and weight saving of such devices have been made. Research and development for improving the energy density of the battery used as a portable power source for such electronic devices, in particular the secondary battery as a key device has been actively promoted. Specially, a nonaqueous electrolyte secondary battery (for example, lithium ion secondary battery) provides higher energy density compared to a lead battery or a nickel cadmium battery as the traditional aqueous electrolyte secondary battery. Therefore, improvement thereof has been considered in various fields.

As an anode material used for the lithium ion secondary battery, carbon materials such as non-graphitizable carbon and graphite, which show a relatively high capacity and good cycle characteristics, have been widely used. However, taking account of the demand for high capacity in these years, it is a task to obtain a higher capacity of the carbon material.

From such a background, a technique for attaining a high capacity with a carbon material by selecting a carbonized material and preparation conditions has been developed (for example, refer to Japanese Unexamined Patent Application Publication No. H08-315825). However, in the case that such a carbon material is used, the anode discharge potential relative to lithium (Li) is from 0.8 V to 1.0 V, and the battery discharge voltage when forming the battery becomes low, and therefore improvement is not expected in view of the battery energy density. Further, there are disadvantages that hysteresis is large in the shape of charge and discharge curve, and energy efficiency in each charge and discharge cycle is low.

Meanwhile, as a high capacity anode exceeding the carbon materials, researches on alloy materials applying the fact that certain metals are electrochemically alloyed with lithium, and the alloy is reversibly generated and decomposed have been promoted. For example, a high capacity anode using Li—Al alloy or Sn alloy has been developed, and further a high capacity anode made of Si alloy has been developed (for example, refer to U.S. Pat. No. 4,950,566).

However, there is a large disadvantage that Li—Al alloy, Sn alloy, or Si alloy is expanded and shrunk associated with charge and discharge, and the anode is pulverized every charge and discharge, and therefore cycle characteristics are very poor.

Therefore, as a method to improve cycle characteristics, it has been considered to inhibit such expansion by alloying tin or silicon (Si). For example, it has been suggested that iron (Fe) and tin are alloyed (refer to "Journal of The Electrochemical Society," 1999, Vol. 146, p. 414). Further, $Mg_2Si$ or the like has been suggested (for example, refer to "Journal of The Electrochemical Society," 1999, Vol. 146, p. 4401).

However, even in the cases using the foregoing methods, it is actual situation that effects of improving cycle characteristics are not sufficient and advantages of the high capacity anode in the alloy material are not sufficiently utilized.

SUMMARY

Therefore, an anode active material containing tin, cobalt, and carbon, in which the carbon content is 9.9 wt % or more and the ratio of cobalt to the total of tin and cobalt is from 30 wt % to 70 wt % has been developed Thereby, cycle characteristics have been significantly improved.

However, in every cycle, metal elements or the like is crystallized, which causes cycle deterioration. Therefore, it has been demanded that such crystallization is inhibited to further improve cycle characteristics.

In view of the foregoing, in the present invention, it is desirable to provide a battery with a high capacity and superior cycle characteristics and an anode active material used for it.

According to an embodiment of the present invention, there is provided an anode active material, in which tin, cobalt, carbon, and a fourth element are contained as an element, the carbon content is from 9.9 wt % to 29.7 wt %, the ratio of cobalt to the total of tin and cobalt is from 30 wt % to 70 wt %, the fourth element is at least one from the group consisting of indium (In), niobium (Nb), germanium (Ge), titanium (Ti), molybdenum (Mo), aluminum (Al), phosphorus (P), and bismuth (Bi), the content thereof is 14.9 wt % or less, and the coordination number of cobalt as a first neighboring atom around tin obtained by the radial structure function calculated based on one scattering theory of X-ray absorption spectroscopy is 4 or less.

According to an embodiment of the present invention, there is provided a battery including a cathode, an anode, and an electrolyte, in which the anode contains an anode active material containing tin, cobalt, carbon, and a fourth element as an element, the carbon content in the anode active material is from 9.9 wt % to 29.7 wt %, the ratio of cobalt to the total of tin and cobalt is from 30 wt % to 70 wt %, the fourth element is at least one from the group consisting of indium, niobium, germanium, titanium, molybdenum, aluminum, phosphorus, and bismuth, the content thereof is 14.9 wt % or less, and the coordination number of cobalt as a first neighboring atom around tin obtained by the radial structure function calculated based on one scattering theory of X-ray absorption spectroscopy is 4 or less.

According to the anode active material of the embodiment of the present invention, tin is contained as an element. Therefore, a high capacity can be obtained. Further, cobalt is contained as an element, and the ratio of cobalt to the total of tin and cobalt is from 30 wt % to 70 wt %. Therefore, while a high capacity is maintained, cycle characteristics can be improved. Further, as an element, carbon is contained in the range from 9.9 wt % to 29.7 wt %. Therefore, cycle characteristics can be more improved. Furthermore, as a fourth element, at least one from the group consisting of indium, niobium, germanium, titanium, molybdenum, aluminum, phosphorus, and bismuth is contained in the range of 14.9 wt % or less. Therefore, cycle characteristics can be further improved. In addition, since the coordination number of cobalt as a first neighboring atom around tin obtained by the radial structure function calculated based on one scattering theory of X-ray absorption spectroscopy is 4 or less, crystallization after cycles can be inhibited. Therefore, according to the battery of the embodiment of the present invention using such an anode active material, a high capacity can be obtained, and superior cycle characteristics can be obtained.

Additional features and advantages are described herein, and will be apparent from, the following Detailed Description and the figures.

DETAILED DESCRIPTION

Figure 1:
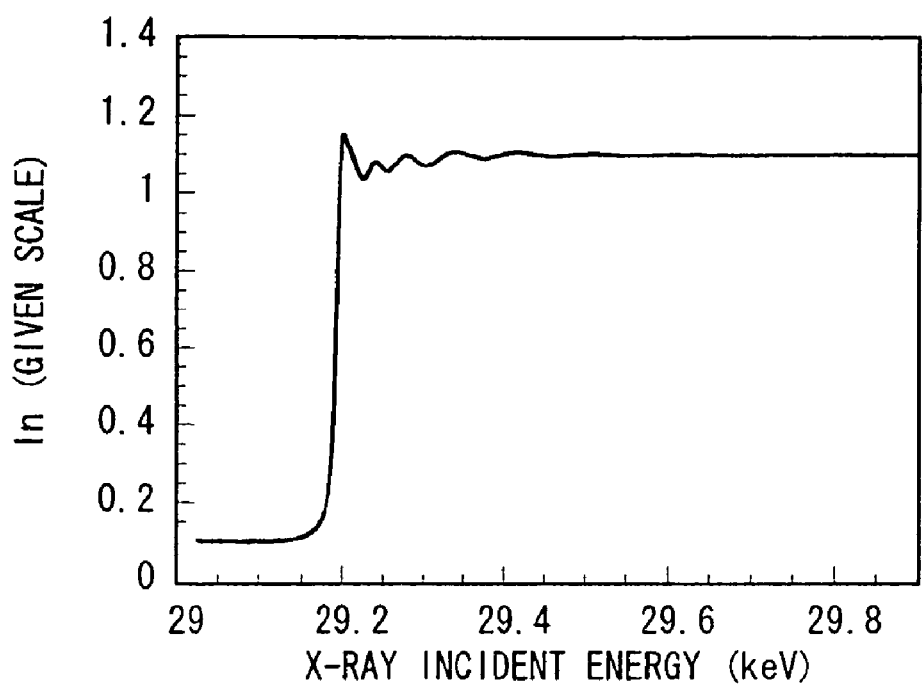
FIG. 1 is a characteristics view showing X-ray absorption fine structure spectrum of an anode active material according to an embodiment of the present invention.

An embodiment of the present invention will be hereinafter described in detail with reference to the drawings.

An anode active material according to an embodiment of the present invention is capable of reacting with lithium or the like, and contains tin and cobalt as an element. Tin has a high reaction amount of lithium per unit weight and provides a high capacity. Further, though it is difficult to sufficiently obtain cycle characteristics by the simple substance of tin, it is possible to improve cycle characteristics by containing cobalt.

The cobalt content is preferably in the range from 30 wt % to 70 wt % in the ratio of cobalt to the total of tin and cobalt, and more preferably in the range from 30 wt % to 60 wt %. When the ratio is lower than the range, the cobalt content declines and it is difficult to obtain sufficient cycle characteristics. Meanwhile, when the ratio is higher than the range, the tin content declines, and it is difficult to obtain the capacity beyond the traditional anode material, for example, the carbon material.

The anode active material further contains carbon in addition to tin and cobalt as an element. By containing carbon, cycle characteristics can be further improved. The carbon content is preferably in the range from 9.9 wt % to 29.7 wt %, more preferably in the range from 14.9 wt % to 29.7 wt %, and in particular, much more preferably in the range from 16.8 wt % to 24.8 wt %. In such a range, high effects can be obtained.

As a fourth element, the anode active material further contains at least one from the group consisting of indium, niobium, germanium, titanium, molybdenum, aluminum, phosphorus, and bismuth. Thereby, cycle characteristics could be further improved. The content of the foregoing element is preferably in the range of 14.9 wt % or less, more preferably in the range from 2.4 wt % to 14.9 wt %, and in particular, much more preferably in the range from 4.0 wt % to 12.9 wt %. When the content thereof is small, it is difficult to obtain sufficient effects. When the content thereof is large, the tin content declines, it is difficult to obtain sufficient capacity, and cycle characteristics also decline.

The anode active material contains carbon and the forth element in addition to tin and cobalt, and thereby the crystallinity is decreased.

As a method of examining crystallinity, for example, X-ray absorption fine structure (XAFS) analysis can be cited. Descriptions will be hereinafter given specifically.

First, X-ray is entered with energy changed in the vicinity of absorption edge of K shell of tin atom (energy: 29.2 keV) to the anode active material. Then, X-ray is entered perpendicular to the anode active material, and an intensity of the incident X-ray ($I_o$) and an intensity of the transmitted X-ray (I) are measured by an ion chamber. From an intensity ratio thereof. In ($I_o$/I), XAFS spectrum is calculated. As a radiation source of X-ray, synchrotron orbit radiation with high luminance capable of changing energy is preferably used. Otherwise, a radiation source of an X-ray generator used in laboratories or the like may be used.

For the obtained XAFS spectrum, the region on the energy side lower than of the absorption edge is fitted by a linear function, and the region on the high energy side is fitted by a quadratic function. Subsequently, the linear function is deducted from the whole spectrum, standardization is made so that the intensity of the quadratic function becomes 1, and background processing is performed. FIG. 1 shows an example of XAFS spectrum. In FIG. 1, the horizontal axis represents energy of X-ray to be entered, and the vertical axis represents the spectrum intensity ratio in.

In FIG. 1, EXAFS (extended X-ray absorption fine structure) is found in the region on the energy side higher than of the absorption edge. The EXAFS reflects interference phenomenon caused by the fact that photoelectron wave emitted from tin as the absorption atom is scattered by the atom coordinated in the absorption atom. That is, the EXAFS includes information of a local structure around tin.

Figure 2:
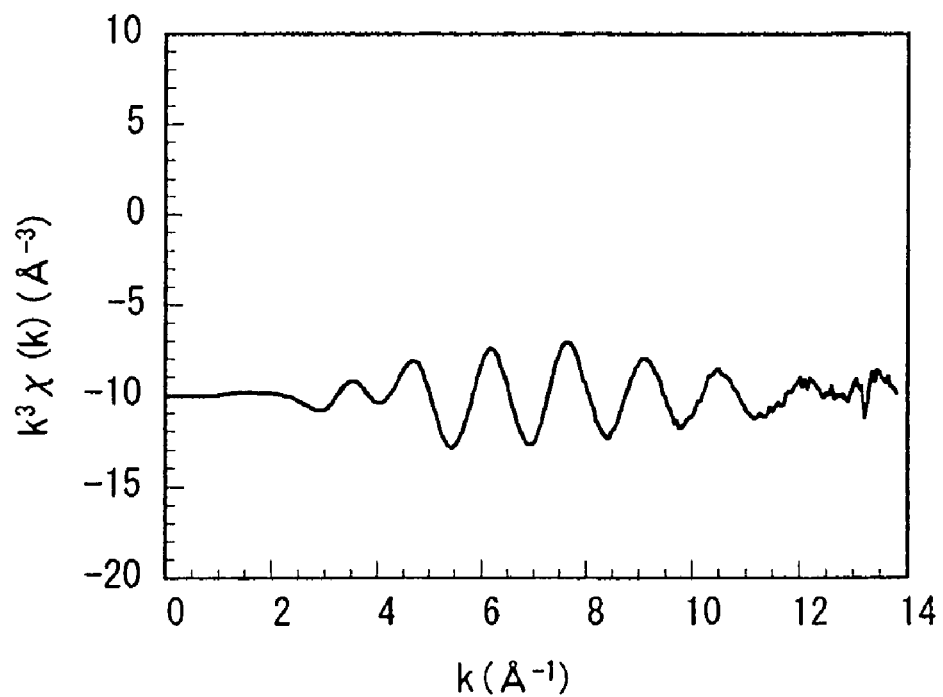
FIG. 2 is a characteristics view showing a relation between x (k) calculated from the X-ray absorption fine structure spectrum shown in FIG. 1 and k3x (k).

Next, absorption coefficient of isolated atom, that is, the oscillation center of EXAFS is estimated by, for example, cubic spline method. The estimated value is deducted from the XAFS spectrum, and an EXAFS component x (k) is extracted. In FIG. 2, the horizontal axis represents a wave number k of photoelectron, and the vertical axis represents k3x (k) obtained by multiplying weight k3 to x (k) by x (k). The wave number k of photoelectron is expressed by Mathematical formula $$k = \frac{2\pi\{2m(E-E_0)\}^{\frac{1}{2}}}{h}$$

Mathematical formula 1

(In the formula, E represents incident energy of X-ray. $E_o$ represents energy of the absorption edge. m represents a weight of electron, and h represents the Planck constant.)

Figure 3:
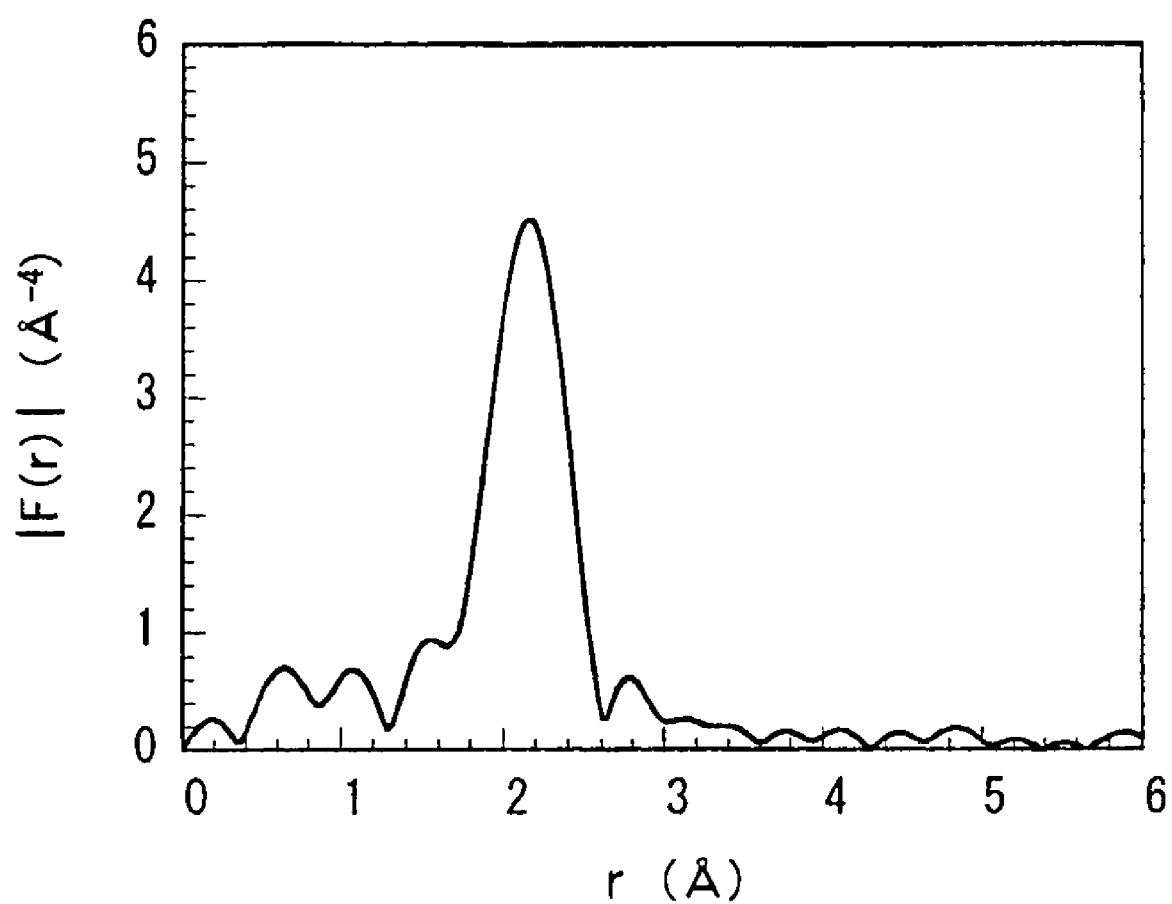
FIG. 3 is a characteristics view showing a radial structure function calculated from the X-ray absorption fine structure spectrum shown in FIG. 1.

Subsequently, a radial structure function, in which various oscillation components are separated and shown in the real space is obtained by providing $k^3x$ (k) with complex Fourier transform. In Fourier transform, Hanning window is set. FIG. 3 shows an example of the radial structure function. The horizontal axis represents a distance r from tin as the absorption atom (however, phase factor is not corrected). The vertical axis represents the value obtained by performing complex Fourier transform for the range from 3 to 12 $Å^{-1}$ of $k^3x$ (k) and finding the absolute value of a real part and an imaginary part, that is, represents an absolute value intensity F (r) of the radial structure function around tin.

In FIG. 3, the peak in the vicinity of 2.2 Å represents the peak originated in the first proximal atom. When the first proximal atom of tin is cobalt, the peak represents the peak originated in cobalt. The smaller the intensity of the peak is, the more disordered the orderliness in the local structure of tin and cobalt as the first proximal atom is, that is, the more decreased the crystallinity is.

Further, in relation to the radial structure function obtained as above, the radial structure function theoretically calculated based on general single scattering theory in X-ray absorption spectroscopy is fitted by nonlinear least-squares method. Thereby, as a result of realizing optimal fitting, the coordination number of the first proximal atom around tin is obtained. In the theory calculation, for the value of back scattering amplitude of photoelectron and the value of phase factor, for example, the values calculated by the program called FEFF are used ("Reviews of modern Physics," J. J. Rehr and R. C. Albers, 2001, Vol. 72, p. 621). Further, the crystal structure of cobalt and tin is presumed based on the description in "Moscow University Chemistry Bulletin," L. A. Panteleimonov, G F. Portnova, and 0. P. Nesterova, 1971, Vol. 26, p. 79). The number of cobalt as the first neighboring atom coordinated around tin is obtained by performing fitting for the peak from 1.5 Å to 2.8 Å in the radial structure function originated in the first atom around tin, assuming that all first adjacent atoms around tin is cobalt. The smaller the coordination number of cobalt as the first adjacent atom around tin is, the lowered crystallinity is.

In the anode active material, specifically, the peak intensity originated in cobalt as the first neighboring atom of tin in the radial structure function around tin is preferably 5.2 $Å^{-4}$ or less. Further, the coordination number of cobalt as the first neighboring atom around tin obtained by the radial structure function calculated based on one scattering theory of X-ray absorption spectroscopy is preferably 4 or less. In the foregoing ranges, crystallinity is sufficiently lowered, and crystallization of metal elements or the like is inhibited in every cycle.

Further, when the peak intensity originated in cobalt as the first neighboring atom in the radial structure function around tin or the coordination number of cobalt as the first neighboring atom around tin obtained by the radial structure function calculated based on one scattering theory of X-ray absorption spectroscopy is within the foregoing range, even if cycles are repeated, crystallization of metal elements or the like is inhibited, and therefore the peak intensity or the coordination number of cobalt is within the foregoing range even if cycles are repeated.

Further, in the anode active material, it can be assumed that there are CoSn crystal structure and $CO_3Sn_2$ crystal structure from the knowledge of X-ray diffraction method. Further, it is thinkable that as cycles are repeated, $CO_3Sn_2$ micro crystal phase is precipitated, and the ratio between the CoSn crystal structure and the $CO_3Sn_2$ crystal structure is changed. In XAFS, when coordination atoms with different interatomic distance exist in proximity to each other, scattered waves of photoelectron interfere and cancel each other out, and the peak intensity originated in the first neighboring atom is decreased. Therefore, as the $CO_3Sn_2$ micro crystal phase having interatomic distance different from the interatomic distance between cobalt and tin in the CoSn crystal structure is precipitated, the peak originated in cobalt as the first neighboring atom is lowered. As described above, crystallization of metal elements or the like affects cycle characteristics. Therefore, less precipitation of the $CO_3Sn_2$ micro crystal phase is preferable. In other words, it is preferable that lowering of the peak originated in cobalt as the first neighboring atom of tin is smaller. Specifically, for the peak intensity originated in cobalt as the first neighboring atom of tin in the radial structure function around tin, 0.84 or more is preferable as the peak intensity ratio in the full discharge state after 50 cycles to a given state, in particular, such a range is preferable as the peak intensity ratio in the full discharge state after 50 cycles to the low battery charge state. In such a range, precipitation of the $CO_3Sn_2$ micro crystal phase is little, and therefore lowering of cycle characteristics can be inhibited.

Further, in the anode active material, it is preferable that at least part of carbon as the element is bonded to a metal element or a metalloid element as other element. It is thinkable that lowered cycle characteristics are caused by cohesion or crystallization of tin or the like; however, such cohesion or crystallization can be inhibited by bonding carbon to other element.

As a measuring method for examining bonding state of elements, for example, X-ray Photoelectron Spectroscopy (XPS) can be cited. XPS is a method for examining element composition and bonding state of elements in the region several nm from the sample surface by irradiating the sample surface with soft X-ray (using Al—Kαray or Mg—Kα ray in the commercially available equipment) and measuring kinetic energy of photoelectron jumping out from the sample surface.

The bound energy of the inner orbital electron of elements is changed in correlation with the electric charge density on the elements in view of first approximation. For example, when the electric charge density of carbon element is decreased by interaction with elements existing in the vicinity thereof, outer-shell electron such as 2p electron is decreased. Therefore, is electron of carbon element is strongly bound by the shell. That is, when the electric charge density of the element is decreased, the bound energy is increased. In XPS, when the bound energy is increased, the peak is shifted to the high energy region.

In XPS, in the case of graphite, the peak of 1 s orbit of carbon (C I s) is observed at 284.5 eV in the apparatus, in which energy calibration is made so that the peak of 4f orbit of gold atom (Au4f) is observed at 84.0 eV. In the case of surface contamination carbon, the peak is observed at 284.8 eV. Meanwhile, in the case of higher electric charge density of carbon element, for example, when carbon is bonded to a metal element or a metalloid element, the peak of C1s is observed in the region lower than 284.5 eV. That is, when the peak of the composite wave of C1s obtained for the anode active material is observed in the region lower than 284.5 eV, at least part of carbon contained in the anode active material is bonded to the metal element or the metalloid element, other element.

In XPS measurement of the anode active material, when the surface is coated with the surface contamination carbon, it is preferable to lightly sputter the surface with the argon ion gun provided with XPS equipment. Further, when the anode active material targeted for measurement exists in the anode of the battery as described later, after the battery is decomposed to take out the anode, the anode shall be washed with a volatile solvent such as dimethyl carbonate in order to remove the solvent with low volatility and an electrolyte salt, which exist on the surface of the anode. Such sampling is desirably performed under the inactive atmosphere.

In XPS measurement, for example, the peak of C1s is used for correcting the energy axis of spectrums. Since surface contamination carbon generally exists on the substance surface, the peak of C1s of the surface contamination carbon is set to 284.8 eV, which is used as an energy reference. In XPS measurement, the waveform of the peak of C1s is obtained as a form including the peak of the surface contamination carbon and the peak of carbon in the anode active material. Therefore, for example, by analyzing the waveform by using a commercially available software, the peak of the surface contamination carbon and the peak of carbon in the anode active material are separated. In the analysis of the waveform, the position of the main peak existing on the lowest bound energy side is set to the energy reference (284.8 eV).

The anode active material can be manufactured by, for example, mixing raw materials of each element, which is dissolved in an electric furnace, a high frequency induction furnace, an arc melting furnace or the like and then solidified. Otherwise, the anode active material can be formed by various atomization methods such as gas atomizing and water atomizing; various roll methods; or a method utilizing mechanochemical method such as mechanical alloying method and mechanical milling method. Specially, the anode active material is preferably formed by the method utilizing mechanochemical reaction since the anode active material thereby becomes a low crystal structure or an amorphous structure. For such a method, for example, a planetary ball mill device can be used.

Further, when the anode active material is formed, by changing processing conditions as appropriate, for example, the peak intensity originated in cobalt as the first neighboring atom in the radial structure function around tin or the coordination number of cobalt as the first neighboring atom around tin obtained by the radial structure function calculated based on one scattering theory of X-ray absorption spectroscopy, that is crystallinity can be changed.

For a raw material, simple substances of each element can be used by mixing. However, for part of elements other than carbon, alloys are preferably used. By synthesizing the anode active material with mechanical alloying method by adding carbon to such an alloy, the anode active material can have a low crystal structure or an amorphous structure, and shortening the reaction time can be achieved. The form of the raw material may be powder or a mass.

For carbon used as a raw material, one or more carbon materials such as non-graphitizable carbon, graphitizable carbon, graphite, pyrolytic carbons, cokes, glassy carbons, organic high molecular weight compound fired body, activated carbon, and carbon black can be used. Of the foregoing, cokes include pitch cokes, needle cokes, petroleum cokes and the like. The organic high molecular weight compound fired body is a substance, obtained by firing and carbonizing a high molecular weight compound such as a phenol resin and a furan resin at appropriate temperatures. The shape of the carbon materials may be any of fibrous, spherical, granulated, and scale-like.

The anode active material is used for a secondary battery as follows, for example.

(First Battery)

Figure 4:
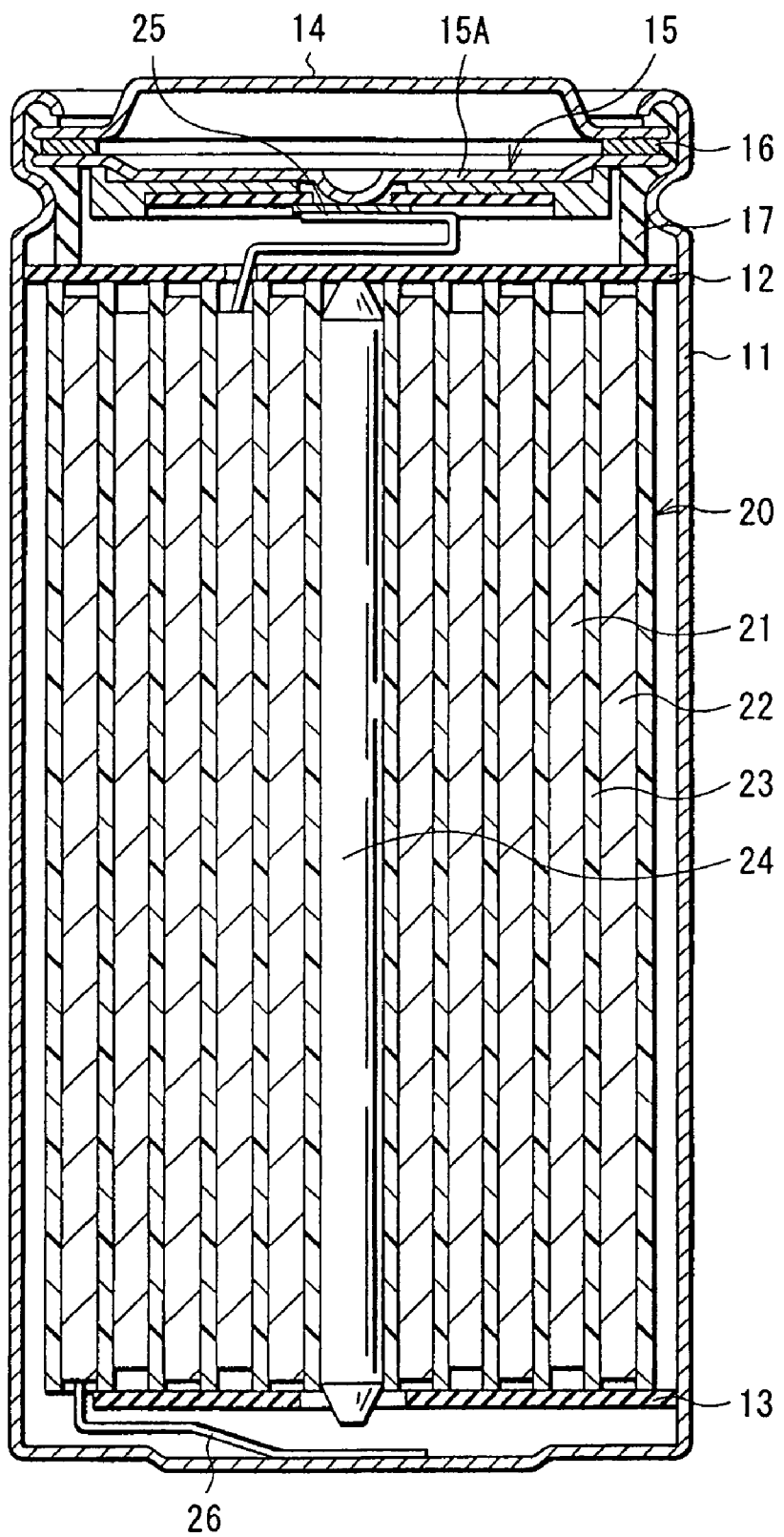
FIG. 4 is a cross section showing a structure of a secondary battery according to an embodiment of the present invention.

FIG. 4 shows a cross sectional structure of a first secondary battery. The secondary battery is a so-called cylinder-type battery, and has a spirally wound electrode body 20 in which a strip-shaped cathode 21 and a strip-shaped anode 22 are layered and wound with a separator 23 inbetween inside a battery can 11 in the shape of approximately hollow cylinder. The battery can 11 is made of, for example, iron plated by nickel. One end of the battery can 11 is closed, and the other end thereof is opened. Inside the battery can 11, an electrolytic solution as the liquid electrolyte is injected and impregnated in the separator 23. Further, a pair of insulating plates 12 and 13 is respectively arranged perpendicular to the winding periphery face, so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked through a gasket 17. Inside of the battery can 11 is thereby sealed. The battery cover 14 is, for example, made of a material similar to that of the battery can 11. The safety valve mechanism 15 is electrically connected to the battery cover 14 through the PTC device 16. When the internal pressure of the battery becomes a certain level or more by internal short circuit, external heating or the like, a disk plate 15A flips to cut the electrical connection between the battery cover 14 and the spirally wound electrode body 20. When temperatures rise, the PTC device 16 limits a current by increasing the resistance value to prevent abnormal heat generation by a large current. The gasket 17 is made of, for example, an insulating material and its surface is coated with asphalt.

For example, the spirally wound electrode body 20 is wound around a center pin 24. A cathode lead 25 made of aluminum or the like is connected to the cathode 21 of the spirally wound electrode body 20. An anode lead 26 made of nickel (Ni) or the like is connected to the anode 22. The cathode lead 25 is electrically connected to the battery cover 14 by being welded to the safety valve mechanism 15. The anode lead 26 is welded and electrically connected to the battery can 11.

Figure 5:
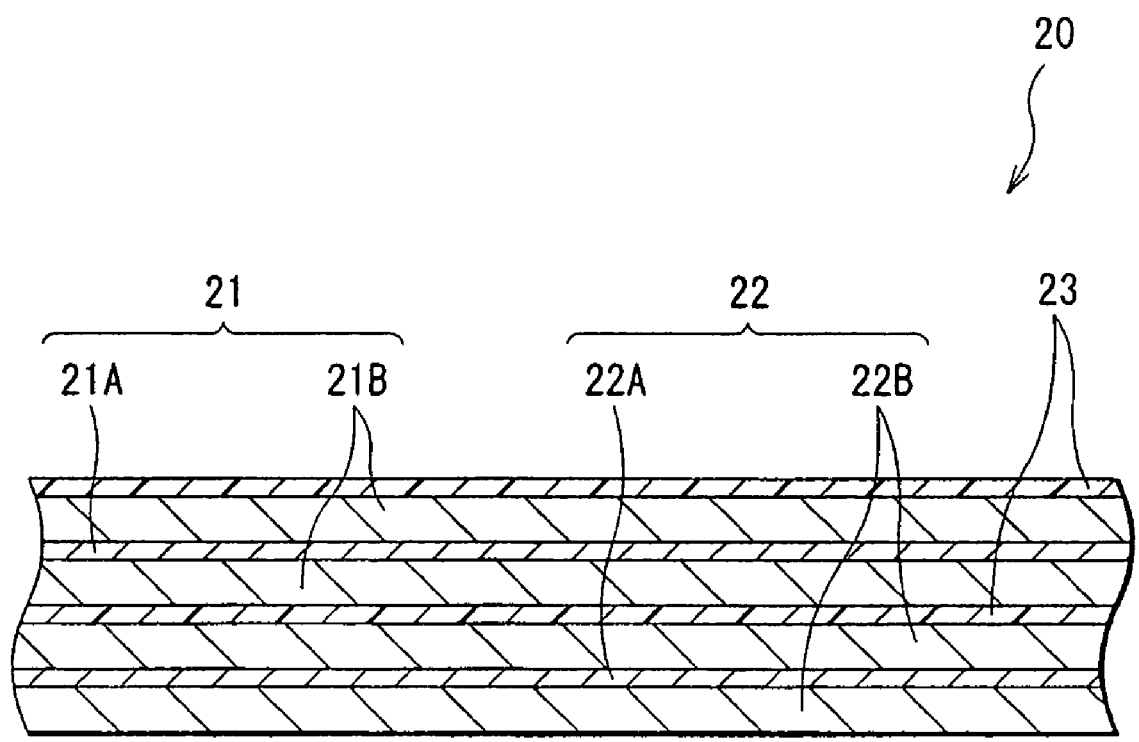
FIG. 5 is a cross section showing an enlarged part of a spirally wound electrode body in the secondary battery shown in FIG. 4.

FIG. 5 shows an enlarged part of the spirally wound electrode body 20 shown in FIG. 4. The cathode 21 has a structure in which, for example, a cathode active material layer 21B is provided on both faces or a single face of a current collector 21A having a pair of opposed faces. The current collector 21A is made of, for example, a metal foil such as an aluminum foil. The cathode active material layer 21B, for example, contains one or more cathode active materials capable of inserting and extracting lithium. If necessary, the cathode active material layer may contain an electrical conductor such as a carbon material and a binder such as polyvinylidene fluoride.

As a cathode active material capable of inserting and extracting lithium, for example, a metal sulfide, a metal oxide or the like containing no lithium such as titanium sulfide ($TiS_2$), molybdenum sulfide ($MoS_2$), niobium selenide ($NbSe_2$), and vanadium oxide ($V_2O_5$) can be cited. Further, a lithium complex oxide whose main body is $Li_xMIO_2$ (in the formula, M represents one or more transition metal elements. A value of x varies according to charge and discharge states of the battery, and the value of x is generally in the range of $0.05 \leq x \leq 1.10$) and the like can be also cited. As a transition metal M composing the lithium complex oxide, cobalt, nickel, or manganese (Mn) is preferable. As a specific example of such a lithium complex oxide, $LiCoO_2$, $LiNiO_2$ $Li_xNi_yCO_{1-y}O_2$ (in the formula, values of x and y vary according to charge and discharge states of the battery, and the values of x and y are generally in the range of $0<x<1$ and $0<y<1.0$), lithium manganese complex oxide having a spinel type structure or the like can be cited.

As the cathode 21, the anode 22 has a structure in which an anode active material layer 22B is provided on both faces or a single face of an anode current collector 22A having a pair of opposed faces. The anode current collector 22A is made of, for example, a metal foil such as a copper foil.

The anode active material layer 22B contains, for example, the anode active material according to this embodiment, and if necessary contains a binder such as polyvinylidene fluoride. Since the anode active material layer 22B contains the anode active material according to this embodiment, in the secondary battery, a high capacity can be obtained, and cycle characteristics can be improved. Further, the anode active material layer 22B may contain other anode active material in addition to the anode active material according to this embodiment, or may contain other material such as an electrical conductor. As other anode active material, for example, a carbon material capable of inserting and extracting lithium can be cited. The carbon material is preferable since the carbon material can improve charge and discharge cycle characteristics and functions as an electrical conductor as well. As a carbon material, for example, the carbon material as that used in manufacturing the anode active material can be cited.

The ratio of the carbon material is preferably in the range from 1 wt % to 95 wt % to the anode active material of this embodiment. When the carbon material is little, the conductivity of the anode 22 is decreased. Meanwhile, when the carbon material is much, the battery capacity is decreased.

The separator 23 separates the cathode 21 from the anode 22, prevents current short circuit due to contact of both electrodes, and lets through lithium ions. The separator 23 is made of, for example, a synthetic resin porous film made of polytetrafluoroethylene, polypropylene, polyethylene or the like, or a ceramics porous film. The separator 23 may have a structure in which two or more of the foregoing porous films are layered.

The electrolytic solution impregnated in the separator 23 contains a solvent and an electrolyte salt dissolved in the solvent. As a solvent, propylene carbonate, ethylene carbonate, diethyl carbonate, dimethyl carbonate, 1,2-dimethoxy ethane, 1,2-diethoxy ethane, -y-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propionitrile, anisole, ester acetate, ester butyrate, ester propionate or the like can be cited. The solvent may be used singly, or two or more thereof may be used by mixing.

The solvent more preferably contains a cyclic ester carbonate derivative having halogen atom. Thereby, decomposition reaction of the solvent in the anode 22 can be inhibited, and cycle characteristics can be improved. As a specific example of such an ester carbonate derivative, 4-fluoro-1,3-dioxolane-2-one expressed in Chemical formula 1, 4-difluoro-1,3-dioxolane-2-one expressed in Chemical formula 2, 4,5-difluoro-1,3-dioxolane-2-one expressed in Chemical formula 3, 4-difluoro-5-fluoro-1,3-dioxolane-2-one expressed in Chemical formula 4, 4-chrolo-1,3-dioxolane-2-one expressed in Chemical formula 5, 4,5-dichrolo-1,3-dioxolane-2-one expressed in Chemical formula 6, 4-bromo-1,3-dioxolane-2-one expressed in Chemical formula 7, 4-iodine-1,3-dioxolane-2-one expressed in Chemical formula 8, 4-fluoromethyl-1,3-dioxolane-2-one expressed in Chemical formula 9, 4-trifluoromethyl-1,3-dioxolane-2-one expressed in Chemical formula 10 or the like can be cited. Specially, 4-fluoro-1,3-dioxolane-2-one is desirable, since higher effects can be thereby obtained.

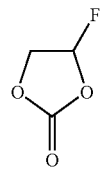

Chemical formula 1

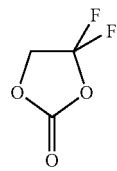

Chemical formula 2

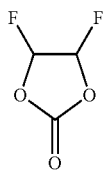

Chemical formula 3

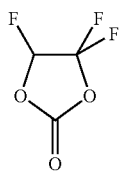

Chemical formula 4

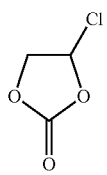

Chemical formula 5

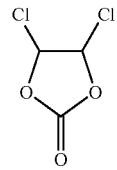

Chemical formula 6

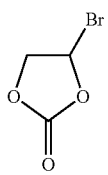

Chemical formula 7

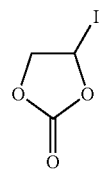

Chemical formula 8

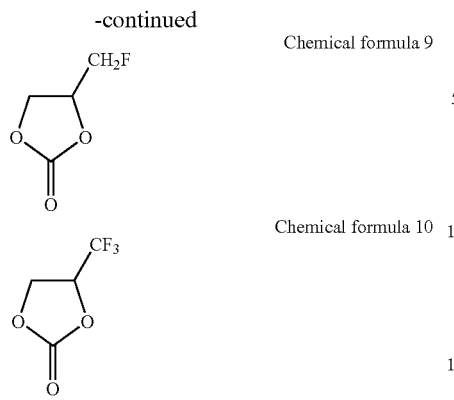

Chemical formula 9

Chemical formula 10

The solvent may be composed of only the ester carbonate derivative. However, the ester carbonate derivative is preferably mixed with a low-boiling-point solvent with a boiling point of 150 deg C. or less in the ambient pressure (1.01325× 105 Pa), since ion conductivity can be thereby improved. The content of the ester carbonate derivative is preferably in the range from 0.1 wt % to 80 wt % to the whole solvent. When the content of ester carbonate derivative is small, effects to inhibit decomposition reaction of the solvent in the anode 22 are not sufficient. Meanwhile, the content of ester carbonate derivative is large, the viscosity becomes high, and the ion conductivity becomes low.

As an electrolyte salt, for example, a lithium salt can be cited. The lithium salt may be used singly, or two or more thereof may be used by mixing. As a lithium salt, $LiClO_4$, $LiAsF_6$, $LiPF_6$, $LiBF_4$, $LiB(C_6H_5)_4$, $CH_3SO_3Li$, $CF_3SO_3Li$, LiCl, LiBr or the like can be cited. As an electrolyte salt, though the lithium salt is preferably used, other electrolyte salt may be used. Lithium ions contributing charge and discharge are enough if supplied from the cathode 21 and the like.

The secondary battery can be manufactured, for example, as follows.

First, for example, a cathode active material, and if necessary an electrical conductor and a binder are mixed to prepare a cathode mixture, which is dispersed in a mixed solvent such as N-methyl-2-pyrrolidone to form a cathode mixture slurry. Next, the cathode current collector 21A is coated with the cathode mixture slurry, which is dried and compression-molded to form the cathode active material layer 21B and form the cathode 21. Subsequently, the cathode lead 25 is welded to the cathode 21.

Further, for example, the anode active material according to this embodiment, and if necessary other anode active material and a binder are mixed to prepare an anode mixture, which is dispersed in a mixed solvent such as N-methyl-2-pyrrolidone to form an anode mixture slurry. Next, the anode current collector 22A is coated with the anode mixture slurry, which is dried and compression-molded to form the anode active material layer 22B and form the anode 22. Subsequently, the anode lead 26 is welded to the anode 22.

After that, the cathode 21 and the anode 22 are wound with the separator 23 inbetween. The end of the cathode lead 25 is welded to the safety valve mechanism 15, and the end of the anode lead 26 is welded to the battery can 11. The wound cathode 21 and the wound anode 22 are sandwiched between the pair of insulating plates 12 and 13, and contained inside the battery can 11. Then, the electrolytic solution is injected into the battery can 11. After that, at the open end of the battery can 11, the battery cover 14, the safety valve mechanism 15, and the PTC device 16 are fixed by being caulked through the gasket 17. The secondary battery shown in FIG. 4 is thereby completed.

In the secondary battery, when charged, for example, lithium ions are extracted from the cathode 21 and inserted in the anode 22 through the electrolyte. When discharged, for example, lithium ions are extracted from the anode 22 and inserted in the cathode 21 through the electrolyte. Here, the anode 22 contains tin, cobalt, and carbon at the foregoing ratio. Further, the anode 22 contains the anode active material, in which the peak intensity originated in cobalt as the first neighboring atom in the radial structure function around tin or the coordination number of cobalt as the first neighboring atom around tin obtained by the radial structure function calculated based on one scattering theory of X-ray absorption spectroscopy is within the foregoing range. Therefore, cycle characteristics are improved while a high capacity is maintained.

As above, according to the anode active material of this embodiment, since tin is contained as an element, a high capacity can be obtained. Further, cobalt is contained as an element, and the ratio of cobalt to the total of tin and cobalt is from 30 wt % to 70 wt %. Therefore, cycle characteristics can be improved while a high capacity is maintained. Further, since as an element, carbon is contained in the range from 9.9 wt % to 29.7 wt %, cycle characteristics can be more improved. Furthermore, since as the fourth element, at least one from the group consisting of indium, niobium, germanium, titanium, molybdenum, aluminum, phosphorus, and bismuth is contained in the range of 14.9 wt % or less, cycle characteristics can be much more improved. In addition, since the coordination number of cobalt as the first neighboring atom around tin obtained by the radial structure function calculated based on one scattering theory of X-ray absorption spectroscopy is 4 or less, crystallization after cycles can be inhibited. Therefore, according to the battery of the embodiment of the present invention using the anode active material, a high capacity can be obtained, and superior cycle characteristics can be obtained. Therefore, according to the first battery of the embodiment of the present invention using the anode active material, a high capacity can be obtained, and superior cycle characteristics can be obtained.

Figure 6:
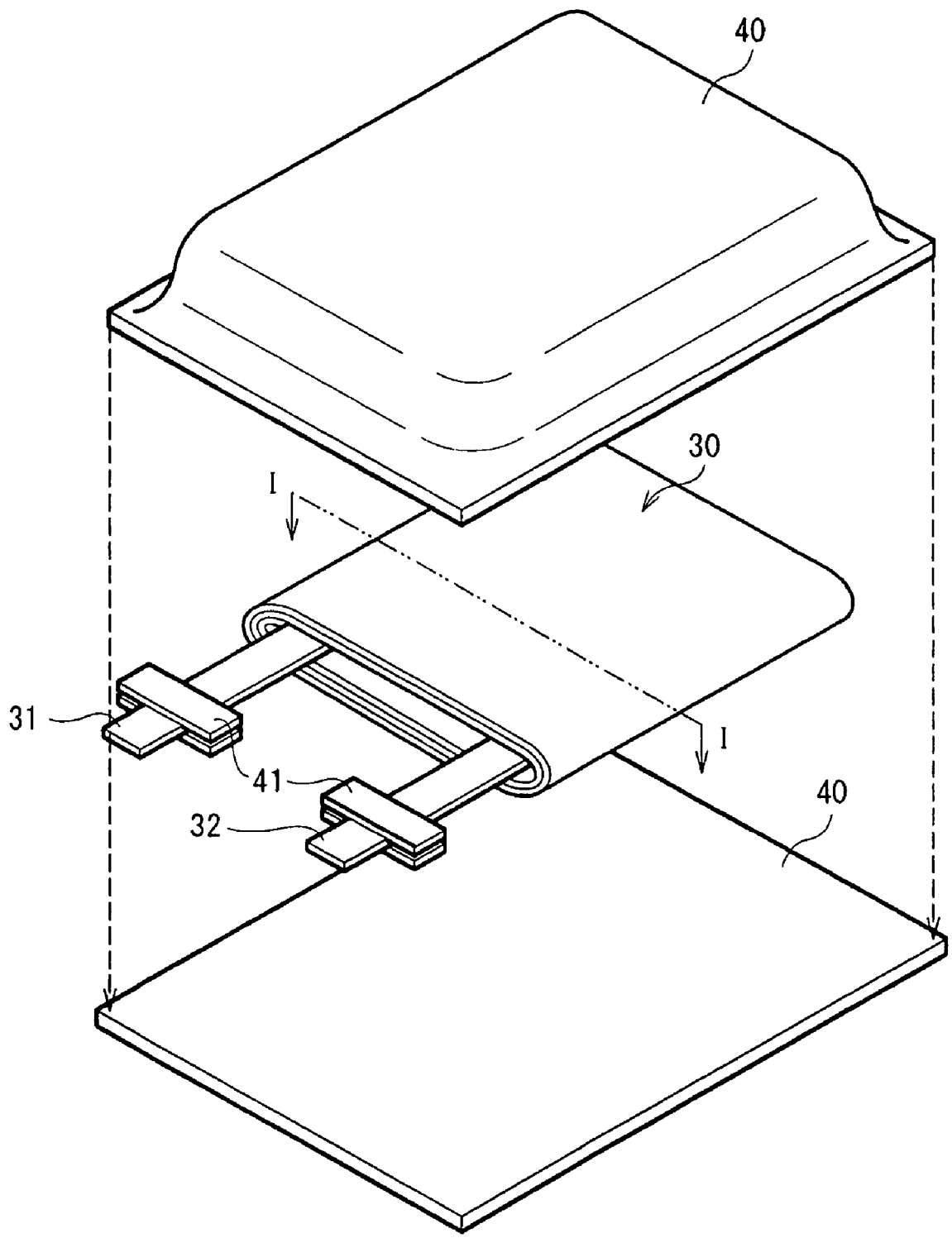
FIG. 6 is an exploded perspective view showing a structure of another secondary battery according to an embodiment of the present invention.

FIG. 6 shows a structure of a second secondary battery. In the secondary battery, a spirally wound electrode body 30 on which a cathode lead 31 and an anode lead 32 are attached is contained inside a film package member 40. Therefore, the size, the weight, and the thickness thereof can be reduced.

The cathode lead 31 and the anode lead 32 are directed from inside to outside of the package member 40 in the same direction, for example, the cathode lead 31 and the anode lead 32 are respectively made of, for example, a metal material such as aluminum, copper, nickel, and stainless, and are in the shape of thin plate or mesh.

The package member 40 is made of a rectangular aluminum laminated film, in which, for example, a nylon film, an aluminum foil, and a polyethylene film are bonded together in this order. The package member 40 is, for example, arranged so that the polyethylene film side and the spirally wound electrode body 30 are opposed, and the respective outer edges are contacted to each other by fusion bonding or an adhesive.

Adhesive films 41 to protect from outside air intrusion are inserted between the package member 40 and the cathode lead 31, the anode lead 32. The adhesive film 41 is made of a material having contact characteristics to the cathode lead 31 and the anode lead 32 such as a polyolefin resin of polyethylene, polypropylene, modified polyethylene, and modified polypropylene.

The package member 40 may be made of a laminated film having other structure, a high molecular weight film such as polypropylene, or a metal film, instead of the foregoing aluminum laminated film.

Figure 7:
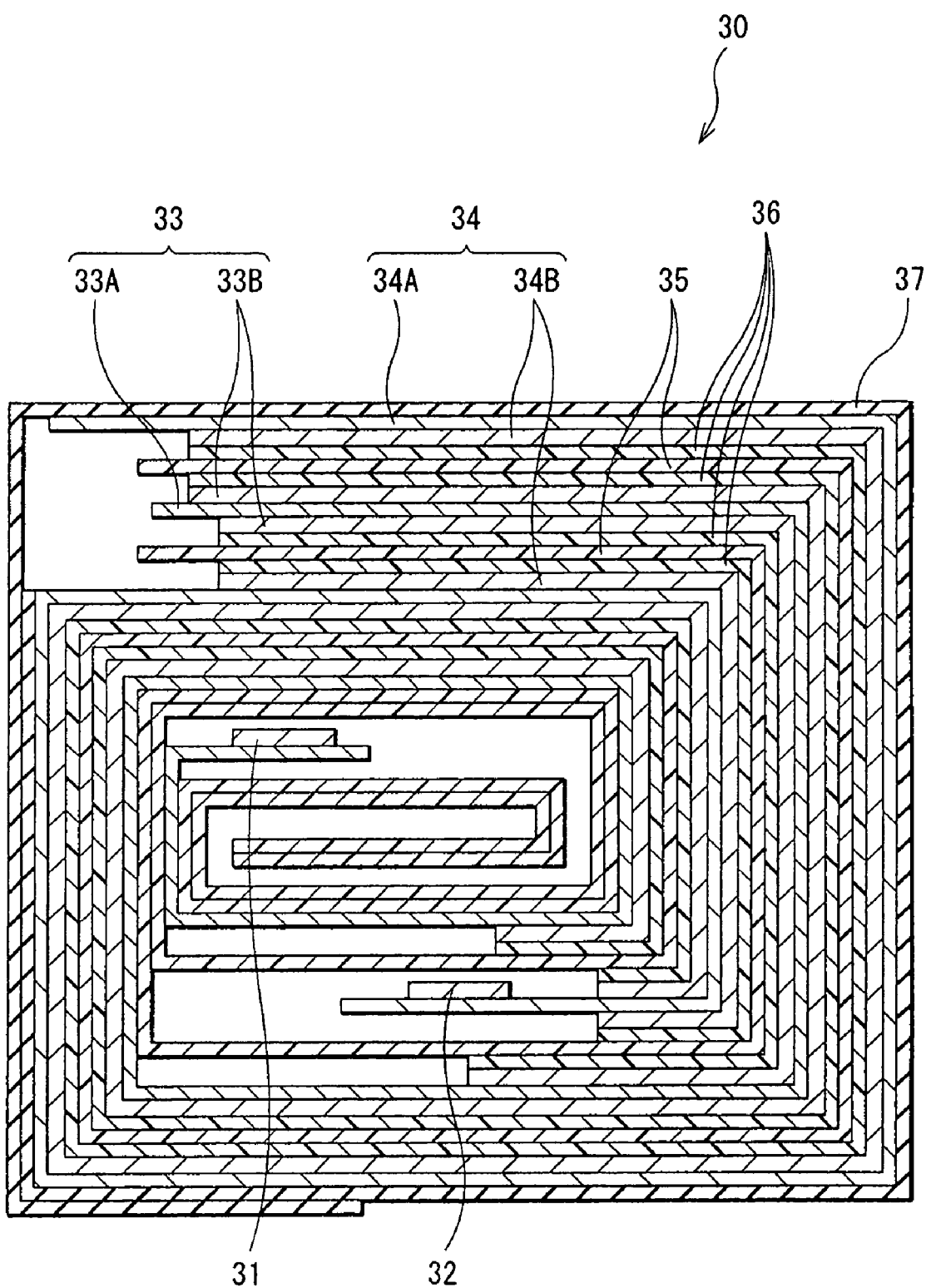
FIG. 7 is a cross section showing a structure taken along line I-I of a spirally wound electrode body shown in FIG. 6.

FIG. 7 shows a cross sectional structure taken along line I-I of the spirally wound electrode body 30 shown in FIG. 6. In the spirally wound electrode body 30, a cathode 33 and an anode 34 are layered with a separator 35 and an electrolyte layer 36 inbetween and wound. The outermost periphery thereof is protected by a protective tape 37.

The cathode 33 has a structure, in which a cathode active material layer 33B is provided on a single face or both faces of a cathode current collector 33A. The anode 34 has a structure in which an anode active material layer 34B is provided on a single face or both faces of a current collector 34A. Arrangement is made so that the anode active material layer 34B side is opposed to the cathode active material layer 33B. Structures of the cathode current collector 33A, the cathode active material layer 33B, the anode current collector 34A, the anode active material layer 34B, and the separator 35 are similar to of the cathode current collector 21A, the cathode active material layer 21B, the anode current collector 22A, the anode active material layer 22B, and the separator 23 respectively described above.

The electrolyte layer 36 is gelatinous, containing an electrolytic solution and a high molecular weight compound to become a holding body, which holds the electrolytic solution. The gelatinous electrolyte layer 36 is preferable, since a high ion conductivity can be thereby obtained, and leak of the battery can be thereby prevented. The structure of the electrolytic solution (that is, a solvent, an electrolyte salt and the like) is similar to of the cylindrical-type secondary battery shown in FIG. 1. As a high molecular weight compound, for example, a fluorinated high molecular weight compound such as polyvinylidene fluoride and a copolymer of vinylidene fluoride and hexafluoro propylene, an ether high molecular weight compound such as polyethylene oxide and a cross-linked body containing polyethylene oxide, polyacrylonitrile or the like can be cited. In particular, in view of redox stability, a fluorinated high molecular weight compound is desirable.

The secondary battery can be manufactured, for example, as follows.

First, the cathode 33 and the anode 34 are respectively coated with a precursor solution containing a solvent, an electrolyte salt, a high molecular weight compound, and a mixed solvent. The mixed solvent is volatilized to form the electrolyte layer 36. After that, the cathode lead 31 is welded to the end of the cathode current collector 33A, and the anode lead 32 is welded to the end of the anode current collector 34A. Next, the cathode 33 and the anode 34 formed with the electrolyte layer 36 are layered with the separator 35 inbetween to obtain a lamination. After that, the lamination is wound in the longitudinal direction, the protective tape 37 is adhered to the outermost periphery thereof to form the spirally wound electrode body 30. Lastly, for example, the spirally wound electrode body 30 is sandwiched between the package members 40, and outer edges of the package members 40 are contacted by thermal fusion-bonding or the like to enclose the spirally wound electrode body 30. Then, the adhesive films 41 are inserted between the cathode lead 31, the anode lead 32 and the package member 40. Thereby, the secondary battery shown in FIG. 6 and FIG. 7 is completed.

Further, the secondary battery may be fabricated as follows. First, as described above, the cathode 33 and the anode 34 are formed, and the cathode lead 31 and the anode lead 32 are attached on the cathode 33 and the anode 34. After that, the cathode 33 and the anode 34 are layered with the separator 35 inbetween and wound. The protective tape 37 is adhered to the outermost periphery thereof, and a winding body, which is the precursor of the spirally wound electrode body 30 is formed. Next, the winding body is sandwiched between the package members 40, the outermost peripheries except for one side are thermal fusion-bonded to obtain a pouched state, and the winding body is contained inside the package member 40. Subsequently, a composition of matter for electrolyte containing a solvent, an electrolyte salt, a monomer as the raw material for the high molecular weight compound, a polymerization initiator, and if necessary other material such as a polymerization inhibitor is prepared, which is injected into the package member 40.

After the composition of matter for electrolyte is injected, the opening of the package member 40 is thermal fusion-bonded and hermetically sealed in the vacuum atmosphere. Next, the resultant is heated to polymerize the monomer to obtain a high molecular weight compound. Thereby, the gelatinous electrolyte layer 36 is formed, and the secondary battery shown in FIG. 6 is assembled.

The secondary battery works similarly to the first secondary battery and provides similar effects.

(Third Battery)

Figure 8:
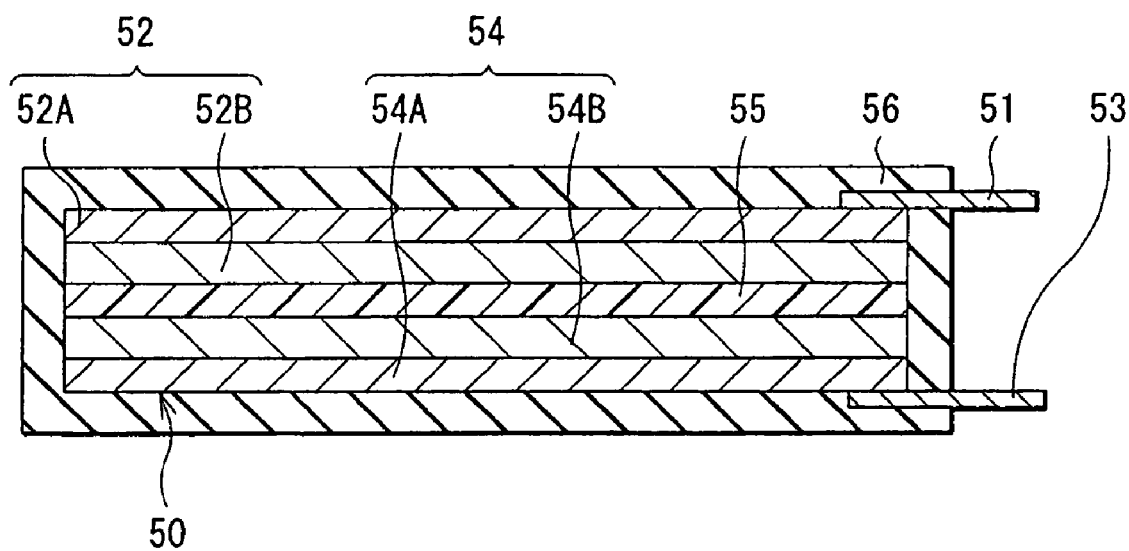
FIG. 8 is a cross section showing a structure of still another secondary battery according to an embodiment of the present invention.

FIG. 8 shows a cross sectional structure of a third secondary battery. In the secondary battery, a flat electrode body 50, in which a cathode 52 to which a cathode lead 51 is attached and an anode 54 to which an anode lead 53 is attached are oppositely arranged with an electrolyte layer 55 inbetween is contained in a film package member 56. The structure of the package member 56 is similar to of the foregoing package member 40.

The cathode 52 has a structure in which a cathode current collector 52A is provided with a cathode active material layer 52B. The anode 54 has a structure in which an anode current collector 54A is provided with an anode active material layer 54B. Arrangement is made so that the anode active material layer 54B side is opposed to the cathode active material layer 52B. The structures of the cathode current collector 52A, the cathode active material layer 52B, the anode current collector 54A, and the anode active material layer 54B are similar to of the foregoing cathode current collector 21A, the cathode active material layer 21B, the anode current collector 22A, and the anode active material layer 22B.

The electrolyte layer 55 is made of, for example, a solid electrolyte. For the solid electrolyte, for example, any inorganic solid electrolyte or any high molecular weight solid electrolyte may be used as long as such electrolyte is a material having lithium ion conductivity. As an inorganic solid electrolyte, an electrolyte containing lithium nitride, lithium iodide or the like can be cited. The high molecular weight solid electrolyte is mainly composed of an electrolyte salt and a high molecular weight compound dissolving the electrolyte salt. As a high molecular weight compound of the high molecular weight solid electrolyte, for example, an ether high molecular weight compound such as polyethylene oxide and a cross linked body containing polyethylene oxide; an ester high molecular weight compound such as polymethacrylate, or an acrylate high molecular weight compound is used singly, or by mixing, or by copolymerization thereof.

The high molecular weight solid electrolyte can be formed by, for example, mixing a high molecular weight compound, an electrolyte salt, and a mixed solvent, and then volatilizing the mixed solvent. Further, the high molecular weight solid electrolyte may be also formed by dissolving an electrolyte salt, a monomer as the raw material of the high molecular weight compound, a polymerization initiator, and if necessary other material such as a polymerization inhibitor in a mixed solvent, volatizing the mixed solvent, polymerizing the monomer by heating to obtain a high molecular weight compound.

The inorganic solid electrolyte can be formed on the surface of the cathode 52 or the anode 54 by, for example, a vapor-phase deposition method such as sputtering method, vacuum deposition method, laser ablation method, ion plating method, and CVD (Chemical Vapor Deposition) method, or a liquid phase deposition method such as sol-gel method.

The secondary battery works similarly to the first or second secondary battery and provides similar effects.

EXAMPLES

Further, specific examples of the present invention will be described in detail.

Examples 1-1 to 1-8

First, an anode active material was formed. As raw materials, cobalt powder, tin powder, carbon powder, titanium powder, molybdenum powder, niobium powder, aluminum powder, germanium powder, phosphorus powder, bismuth powder, and indium powder were prepared. Next, in Example 1-1, cobalt powder, tin powder, and titanium powder were alloyed to form cobalt-tin-titanium alloy powder, to which carbon powder was added and dry-mixed. In Examples 1-2 to 1-6 and 1-8, cobalt powder and tin powder were alloyed to form cobalt-tin alloy powder, to which carbon powder and molybdenum powder, niobium powder, aluminum powder, germanium powder, aluminum powder and phosphorus powder, or indium powder were added and dry-mixed. In Example 1-7, cobalt powder, tin powder, and bismuth powder were alloyed to form cobalt-tin-bismuth alloy powder, to which carbon powder were added and dry-mixed. The ratio of raw materials is as shown in Table 1. Subsequently, 20 g of the mixture and about 400 g of a steel ball being 9 mm in diameter were set in the reaction vessel of a planetary ball mill of Ito Seisakusho. Next, inside of the reaction vessel was substituted with the argon atmosphere. Then, 10-minute operation at 250 rpm and 10-minute interval were repeated until the total operation time became 30 hours. After that, the reaction vessel was cooled down to room temperatures and the synthesized anode active material powder was taken out. Coarse grains were removed through a sieve having 280 meshes.

TABLE 1

| | Raw material ratio (wt %) | | | | | | | | | | |
|---|---|---|---|---|---|---|---|---|---|---|---|
| | Co | Sn | C | Ti | Mo | Nb | Al | Ge | P | Bi | In |
| Example 1-1 | 28.1 | 47.9 | 20.0 | 4.0 | — | — | — | — | — | — | — |
| Example 1-2 | 29.6 | 46.6 | 20.0 | — | 3.8 | — | — | — | — | — | — |
| Example 1-3 | 29.6 | 46.6 | 20.0 | — | — | 3.8 | — | — | — | — | — |
| Example 1-4 | 29.6 | 45.4 | 20.0 | — | — | — | 5.0 | — | — | — | — |
| Example 1-5 | 29.6 | 45.4 | 20.0 | — | — | — | — | 5.0 | — | — | — |
| Example 1-6 | 30.0 | 45.0 | 18.0 | — | — | — | 5.0 | — | 2.0 | — | — |
| Example 1-7 | 23.0 | 48.0 | 23.0 | — | — | — | — | — | — | 6.0 | — |
| Example 1-8 | 27.3 | 50.7 | 18.0 | — | — | — | — | — | — | — | 4.0 |

TABLE 1-continued

| | Raw material ratio (wt %) | | | | | | | | | | |
|---|---|---|---|---|---|---|---|---|---|---|---|
| | Co | Sn | C | Ti | Mo | Nb | Al | Ge | P | Bi | In |
| Comparative example 1-1 | 33.0 | 56.0 | 11.0 | — | — | — | — | — | — | — | — |
| Comparative example 1-2 | 29.6 | 50.4 | 20.0 | — | — | — | — | — | — | — | — |

Figure 9:
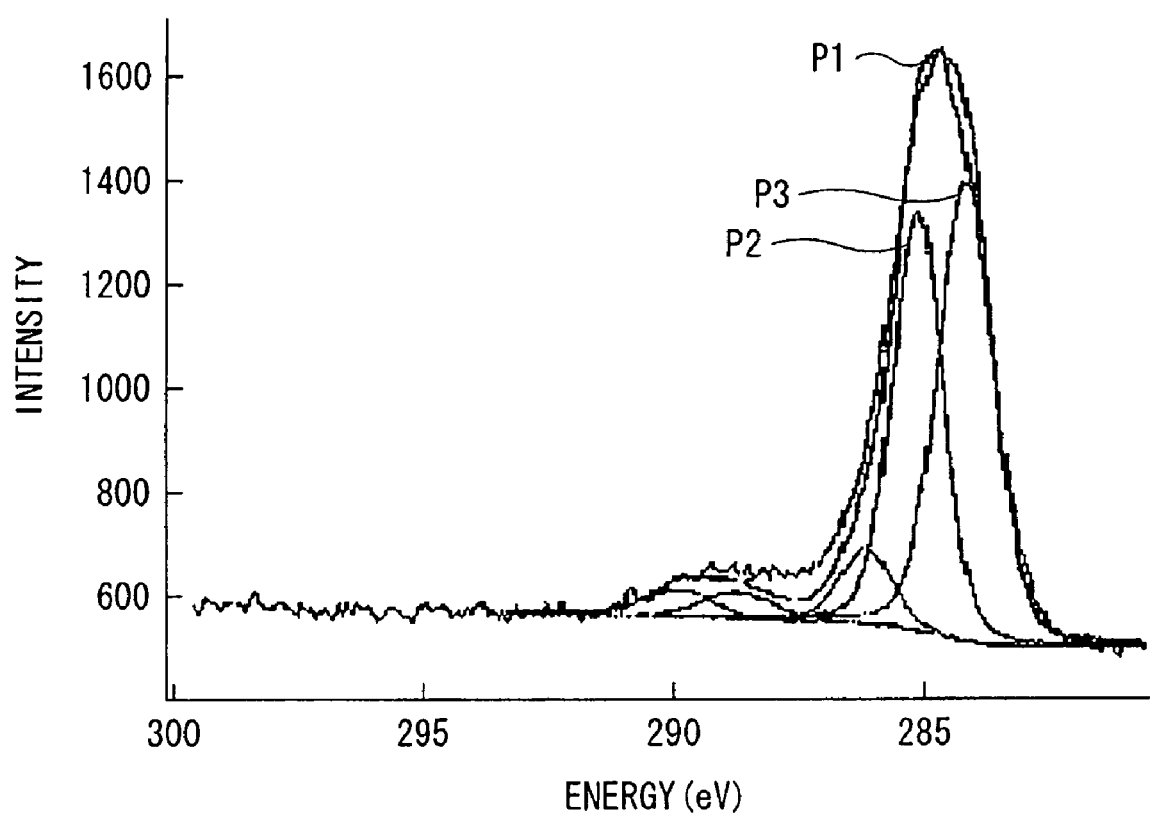
FIG. 9 shows an example of peaks obtained by X-ray photoelectron spectroscopy according to anode active materials formed in Examples.

Regarding the obtained anode active material, the composition was analyzed. The carbon content was measured by a carbon sulfur analyzer. The contents of cobalt, tin, titanium, molybdenum, niobium, aluminum, germanium, phosphorus, bismuth, and indium were measured by ICP (Inductively Coupled Plasma) optical emission spectroscopy. The analytical values are shown in Table 2. The raw material ratios and the analytical values shown in Tables 1 and 2 were obtained by half-adjusting the hundredth. In subsequent Examples, the raw material ratios and the analytical values are similarly shown. Further, when XPS was performed, as shown in FIG. 9, a peak P1 was obtained. When the peak P1 was analyzed, a peak P2 of surface contamination carbon and a peak P3 of C1s in the anode active material on the energy side lower than of the peak P2 were obtained. For all Examples 1-1 to 1-8, the peak P3 was obtained in the region lower than 284.5 eV. That is, it was confirmed that carbon in the anode active material was bonded to other element.

TABLE 2

| | Analytical value (wt %) | | | | | | | | | | |
|---|---|---|---|---|---|---|---|---|---|---|---|
| | Co | Sn | C | Ti | Mo | Nb | Al | Ge | P | Bi | In |
| Example 1-1 | 27.8 | 47.4 | 19.8 | 4.0 | — | — | — | — | — | — | — |
| Example 1-2 | 29.3 | 46.1 | 19.8 | — | 3.8 | — | — | — | — | — | — |
| Example 1-3 | 29.3 | 46.1 | 19.8 | — | — | 3.8 | — | — | — | — | — |
| Example 1-4 | 29.3 | 44.9 | 19.8 | — | — | — | 5.0 | — | — | — | — |
| Example 1-5 | 29.3 | 44.9 | 19.8 | — | — | — | — | 5.0 | — | — | — |
| Example 1-6 | 29.7 | 44.5 | 17.8 | — | — | — | 5.0 | — | 2.0 | — | — |
| Example 1-7 | 22.8 | 47.5 | 22.8 | — | — | — | — | — | — | 6.0 | — |
| Example 1-8 | 27.0 | 50.2 | 17.8 | — | — | — | — | — | — | — | 4.0 |
| Comparative example 1-1 | 32.6 | 55.9 | 10.9 | — | — | — | — | — | — | — | — |
| Comparative example 1-2 | 29.3 | 49.9 | 19.8 | — | — | — | — | — | — | — | — |

Regarding the obtained anode active material, as described above, the peak intensity originated in cobalt as the first neighboring atom in the radial structure function around tin and the coordination number of cobalt as the first neighboring atom around tin obtained by the radial structure function calculated based on one scattering theory of X-ray absorption spectroscopy were obtained. The results are shown in Table 3.

TABLE 3

| | Co coordination number | | | Co peak intensity ($\text{Å}^{-4}$) | | | Capacity retention ratio (%) | |
|---|---|---|---|---|---|---|---|---|
| | Low battery charge state | After 50 cycles | After 100 cycles | Low battery charge state | After 50 cycles | Peak intensity ratio | 50th cycles | 100th cycle |
| Example 1-1 | 3.34 | 2.91 | 3.03 | 4.5 | 3.9 | 0.87 | 93 | 88 |
| Example 1-2 | 3.51 | 3.15 | 3.26 | 4.7 | 4.0 | 0.85 | 90 | 84 |
| Example 1-3 | 3.38 | 2.96 | 3.06 | 4.5 | 3.9 | 0.87 | 93 | 88 |
| Example 1-4 | 3.43 | 3.03 | 3.15 | 4.8 | 4.1 | 0.85 | 92 | 85 |

TABLE 3-continued

|  | Co coordination number | | | Co peak intensity ($Å^{-4}$) | | | Capacity retention ratio (%) | |
| --- | --- | --- | --- | --- | --- | --- | --- | --- |
|  | Low battery charge state | After 50 cycles | After 100 cycles | Low battery charge state | After 50 cycles | Peak intensity ratio | 50th cycles | 100th cycle |
| Example 1-5 | 3.60 | 3.31 | 3.42 | 4.6 | 4.0 | 0.87 | 90 | 86 |
| Example 1-6 | 3.55 | 3.23 | 3.33 | 4.8 | 4.1 | 0.85 | 90 | 87 |
| Example 1-7 | 3.55 | 3.29 | 3.38 | 4.7 | 4.1 | 0.87 | 91 | 85 |
| Example 1-8 | 3.57 | 3.28 | 3.35 | 4.7 | 4.1 | 0.87 | 90 | 86 |
| Comparative example 1-1 | 5.01 | 4.68 | 4.75 | 6.5 | 5.1 | 0.78 | 80 | 54 |
| Comparative example 1-2 | 4.83 | 4.48 | 4.56 | 5.9 | 4.8 | 0.81 | 87 | 76 |

Further, the cylindrical-type secondary battery shown in FIG. 4 was fabricated. First, a cathode active material made of a nickel oxide, Ketjen black as the electrical conductor, and polyvinylidene fluoride as the binder were mixed at a weight ratio of nickel oxide:Ketjen black:polyvinylidene fluoride=94:3:3. The mixture was dispersed in a mixed solvent such as N-methyl-2-pyirolidone to obtain a cathode mixture slurry. Both faces of the cathode current collector 21A made of a strip-shaped aluminum foil were uniformly coated with the cathode mixture slurry, which was dried and compress-molded by a rolling press machine to form the cathode active material layer 21B and form the cathode 21. After that, the cathode lead 25 made of aluminum was attached to one end of the cathode current collector 21A.

The anode active material formed as above; graphite as the electrical conductor and other anode active material; acetylene black as the electrical conductor; and polyvinylidene fluoride as the binder were mixed at a weight ratio of anode active material:graphite:acetylene black:polyvinylidene fluoride=70:20:1:4, the mixture was dispersed in an appropriate mixed solvent to obtain a slurry. Both faces of the anode current collector 22A made of a strip-shaped copper foil were uniformly coated with the slurry, which was dried and compress-molded by a rolling press machine to form the anode active material layer 22B and form the anode 22. Subsequently, the anode lead 26 made of nickel was attached to one end of the anode current collector 22A.

After the cathode 21 and the anode 22 were respectively formed, the separator 23 was prepared. Then, the anode 22, the separator 23, the cathode 21, and the separator 23 were layered in this order, and the resultant lamination was spirally wound many times. Thereby, the spirally wound electrode body 20 was formed.

After the spirally wound electrode body 20 was formed, the spirally wound electrode body 20 was sandwiched between the pair of insulating plates 12 and 13. The anode lead 26 was welded to the battery can 11, the cathode lead 25 was welded to the safety valve mechanism 15, and the spirally wound electrode body 20 was contained inside the battery can 11 made of nickel-plated iron. After that, an electrolytic solution was injected into the battery can 11 by depressurization method. Then, for the electrolytic solution, the solution obtained by dissolving $LiPF_6$ as an electrolyte salt in a mixed solvent of ethylene carbonate, propylene carbonate, and dimethyl carbonate was used.

After the electrolytic solution was injected in the battery can 11, by caulking the battery can 11 with the battery cover 14 through the gasket 17 with the surface coated with asphalt, the cylindrical-type secondary battery shown in FIG. 4 was obtained.

Regarding the obtained secondary batteries, cycle characteristics were measured. The results are shown in Table 3. Then, cycle characteristics were measured as follows.

First, after constant current charge was performed at a constant current of 0.5 A until the battery voltage reached 4.2 V, constant voltage charge was performed at a constant voltage of 4.2 V until the current reached 10 mA. Subsequently, constant current discharge was performed at a constant current of 0.25 A until the battery voltage reached 2.6 V. Thereby, charge and discharge at the first circle was performed.

On and after the second cycle, after constant current charge was performed at a constant current of 1.4 A until the battery voltage reached 4.2 V, constant voltage charge was performed at a constant voltage of 4.2 V until the current reached 10 mA. Subsequently, constant current discharge was performed at a constant current of 1.0 A until the battery voltage reached 2.6 V. For cycle characteristics, the discharge capacity retention ratio at the 50th cycle or the 100th cycle to the discharge capacity at the second cycle was obtained.

Separately from the foregoing, batteries respectively provided with charge and discharge 2 cycles, 50 cycles, and 100 cycles under similar conditions were disassembled and the anode 22 was taken out. The taken out anode 22 was punched out in the shape of pellet being 15 mm in diameter. The resultant was vacuum-dried for about 1 hour at 60 deg C. Discharge at the second cycle, the 50th cycle, or the 100th cycle was performed until the battery voltage reached 2.5 V. Then, as described above, the peak intensity originated in cobalt as the first neighboring atom in the radial structure function around tin and the coordination number of cobalt as the first neighboring atom around tin obtained by the radial structure function calculated based on one scattering theory of X-ray absorption spectroscopy were obtained as well. The results of examples provided with charge and discharge 50 cycles and 100 cycles are shown in Table 3. Further, the peak intensity ratio originated in cobalt as the first neighboring atom in the radial structure function around tin in the discharge state after 50 cycles to the uncharged state is shown in Table 3.

As Comparative example 1-1 and 1-2 relative to Examples 1-1 to 1-8, anode active materials and secondary batteries were fabricated as in Examples 1-1 to 1-8, except that the fourth element was not mixed in the raw material. At that time, the raw material ratio of cobalt powder, tin powder, and carbon powder is as shown in Table 1. For these anode active materials, composition was analyzed as in Examples 1-1 to 1-8. The results are shown in Table 2. Further, when XPS was performed, as shown in FIG. 9, the peak P1 was obtained. When the peak P1 was analyzed, the peak P2 of surface contamination carbon and the peak P3 of C1s in the anode active material on the energy side lower than of the peak P2 were obtained. For both Comparative examples 1-1 and 1-2, the peak P3 was obtained in the region lower than 284.5 eV. That is, it was confirmed that carbon in the anode active material was bonded to other element. Further, for the obtained anode active materials, as in Examples 1-1 to 1-8, the peak intensity originated in cobalt as the first neighboring atom in the radial structure function around tin and the coordination number of cobalt as the first neighboring atom around tin obtained by the radial structure function calculated based on one scattering theory of X-ray absorption spectroscopy were obtained. The results are shown in Table 3.

Regarding the secondary battery, cycle characteristics were similarly examined. The results are shown in Table 3.

Figure 10:
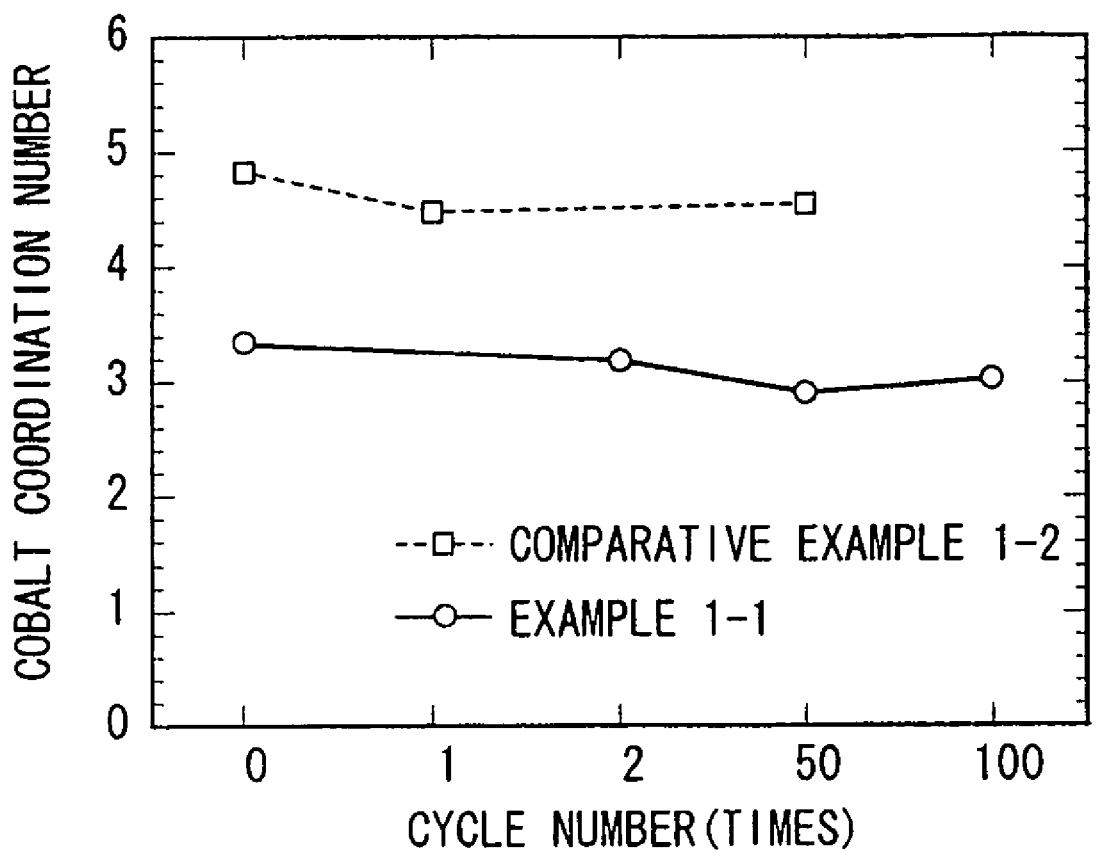
FIG. 10 is a characteristics view showing a relation between cycle numbers and coordination numbers of cobalt for an anode active material formed in Example and an anode active material formed in Comparative example.

Further, separately from the foregoing, as in Examples 1-1 to 1-8, batteries respectively provided with charge and discharge, 1 cycle, 50 cycles, and 100 cycles were disassembled and the anode was taken out. Then, the peak intensity originated in cobalt as the first neighboring atom in the radial structure function around tin, the coordination number of cobalt as the first neighboring atom around tin obtained by the radial structure function calculated based on one scattering theory of X-ray absorption spectroscopy, and the peak intensity ratio originated in cobalt as the first neighboring atom in the radial structure function around tin in the discharge state after 50 cycles to the uncharged state were obtained. The results of examples provided with 50 cycles and 100 cycles are shown in Table 3. The discharge at the first cycle was performed until the battery voltage reached 2.5 V. Further, in FIG. 10, change in the coordination number of cobalt as the first neighboring atom around tin obtained by the radial structure function calculated based on one scattering theory of X-ray absorption spectroscopy to the 100th cycle for Example 1-1 and Comparative example 1-2 is shown.

As evidenced by Tables 1 to 3, according to Examples 1-1 to 1-8, in which at least one from the group consisting of indium, niobium, germanium, titanium, molybdenum, aluminum, phosphorus, and bismuth was contained as the fourth element; coordination number of cobalt as the first neighboring atom around tin obtained by the radial structure function calculated based on one scattering theory of X-ray absorption spectroscopy was 4 or less; the peak intensity originated in cobalt as the first neighboring atom in the radial structure function around tin was 5.2 Å$^{-4}$ or less; and the peak intensity in the discharge state at the 50th cycle originated in cobalt as the first neighboring atom in the radial structure function around tin to the peak intensity in the uncharged state was 0.84 or more, the capacity retention ratio was higher than of Comparative examples 1-1 and 1-2 with the values out of the foregoing requirements.

That is, it was found that when the anode active material, in which as the fourth element at least one from the group consisting of niobium, germanium, titanium, molybdenum, aluminum, phosphorus, and bismuth was contained; coordination number of cobalt as the first neighboring atom around tin obtained by the radial structure function calculated based on one scattering theory of X-ray absorption spectroscopy was 4 or less; the peak intensity originated in cobalt as the first neighboring atom in the radial structure function around tin was 5.2 Å$^{-4}$ or less; and the peak intensity ratio originated in cobalt as the first neighboring atom in the radial structure function around tin in the discharge state after 50 cycles to a given state was 0.84 or more was contained, cycle characteristics could be more improved.

Examples 2-1 and 2-2

Anode active materials and secondary batteries were formed as in Example 1-1, except that synthetic conditions of the anode active materials were changed. The total of rotational speed and operation time were respectively 300 rpm and 30 hours in Example 2-1, and 250 rpm and 25 hours in Example 2-2.

As Comparative examples 2-1 to 2-4 relative to Examples 2-1 and 2-2, anode active materials and secondary batteries were formed as in Examples 2-1 and 2-2, except that synthetic conditions of the anode active materials were changed. The total of rotational speed and operation time were respectively 150 rpm and 30 hours in Comparative example 2-1, 200 rpm and 30 hours in Comparative example 2-2, 250 rpm and 15 hours in Comparative example 2-3, and 250 rpm and 20 hours in Comparative example 2-4.

Regarding the anode active materials, XPS was performed and obtained peaks were analyzed. As in Examples 1-1 to 1-8, the peak P2 of surface contamination carbon and the peak P3 of C1s in the anode active material were obtained. The peak P3 was obtained in the region lower than 284.5 eV. That is, it was confirmed that at least part of carbon contained in the anode active material was bonded to other elements. Further, as in Examples 1-1 to 1-8, the coordination number of cobalt as the first neighboring atom around tin obtained by the radial structure function calculated based on one scattering theory of X-ray absorption spectroscopy and the peak intensity originated in cobalt as the first neighboring atom in the radial structure function around tin were obtained. Further, regarding the secondary batteries, the coordination number of cobalt as the first neighboring atom around tin obtained by the radial structure function calculated based on cycle characteristics and one scattering theory of X-ray absorption spectroscopy, the peak intensity originated in cobalt as the first neighboring atom in the radial structure function around tin, and the peak intensity ratio originated in cobalt as the first neighboring atom in the radial structure function around tin in the discharge state after 50 cycles to the uncharged state were obtained. The results are shown in Table 4.

TABLE 4

|  | Synthetic conditions | | Co coordination number | | | Co peak intensity ($Å^{-4}$) | | Peak intensity ratio | Capacity retention ratio (%) | |
|---|---|---|---|---|---|---|---|---|---|---|
|  | Revolution (rpm) | Processing time (time) | Uncharged state | After 50 cycles | After 100 cycles | Uncharged state | After 50 cycles |  | 50th cycle | 100th cycle |
| Example 1-1 | 250 | 30 | 3.34 | 2.91 | 3.03 | 4.5 | 3.9 | 0.87 | 93 | 88 |
| Example 2-1 | 300 | 30 | 3.31 | 2.86 | 3.00 | 4.4 | 3.9 | 0.89 | 93 | 88 |
| Example 2-2 | 250 | 25 | 3.56 | 3.19 | 3.26 | 4.6 | 4.0 | 0.87 | 90 | 85 |
| Comparative example 2-1 | 150 | 30 | 5.85 | 5.42 | 5.56 | 7.2 | 5.3 | 0.74 | 55 | 34 |
| Comparative example 2-2 | 200 | 30 | 5.52 | 4.89 | 4.99 | 6.9 | 5.2 | 0.75 | 75 | 45 |
| Comparative example 2-3 | 250 | 15 | 5.41 | 4.77 | 4.85 | 6.7 | 5.2 | 0.78 | 77 | 50 |
| Comparative example 2-4 | 250 | 20 | 4.91 | 4.52 | 4.60 | 6.0 | 4.8 | 0.80 | 86 | 74 |

As evidenced by Table 4, it was found that by changing synthetic conditions of the anode active material, the peak intensity originated in cobalt as the first neighboring atom of tin in the radial structure function around tin and the coordination number of cobalt as the first neighboring atom around tin obtained by the radial structure function calculated based on one scattering theory of X-ray absorption spectroscopy could be changed. Also in this case, when the anode active material, in which the coordination number of cobalt as the first neighboring atom around tin obtained by the radial structure function calculated based on one scattering theory of X-ray absorption spectroscopy was 4 or less, the peak intensity originated in cobalt as the first neighboring atom in the radial structure function around tin was 5.2 $Å^{-4}$ or less, and the peak intensity ratio originated in cobalt as the first neighboring atom in the radial structure function around tin in the discharge state after the 50 cycles to a given state was 0.84 or more is contained, cycle characteristics could be improved.

Examples 3-1 and 3-2

Secondary batteries were fabricated as in Example 1-1, except that the anode active material was synthesized by changing the raw material ratio of cobalt, tin, carbon, and titanium as shown in Table 5. Specifically, the Co/(Sn+Co) ratio was set to a constant value, 37 wt %, the raw material ratio of titanium was set to a constant value, and the raw material ratio of carbon was set to 10 wt % or 30 wt %.

As Comparative example 3-1 relative to Examples 3-1 and 3-2, an anode active material and a secondary battery were formed as in Examples 3-1 and 3-2, except that carbon powder was not used as a raw material. Further, as Comparative example 3-2, an anode active material and a secondary battery were fabricated as in Examples 3-1 and 3-2, except that the raw material ratio of carbon was 40 wt %.

Figure 11:
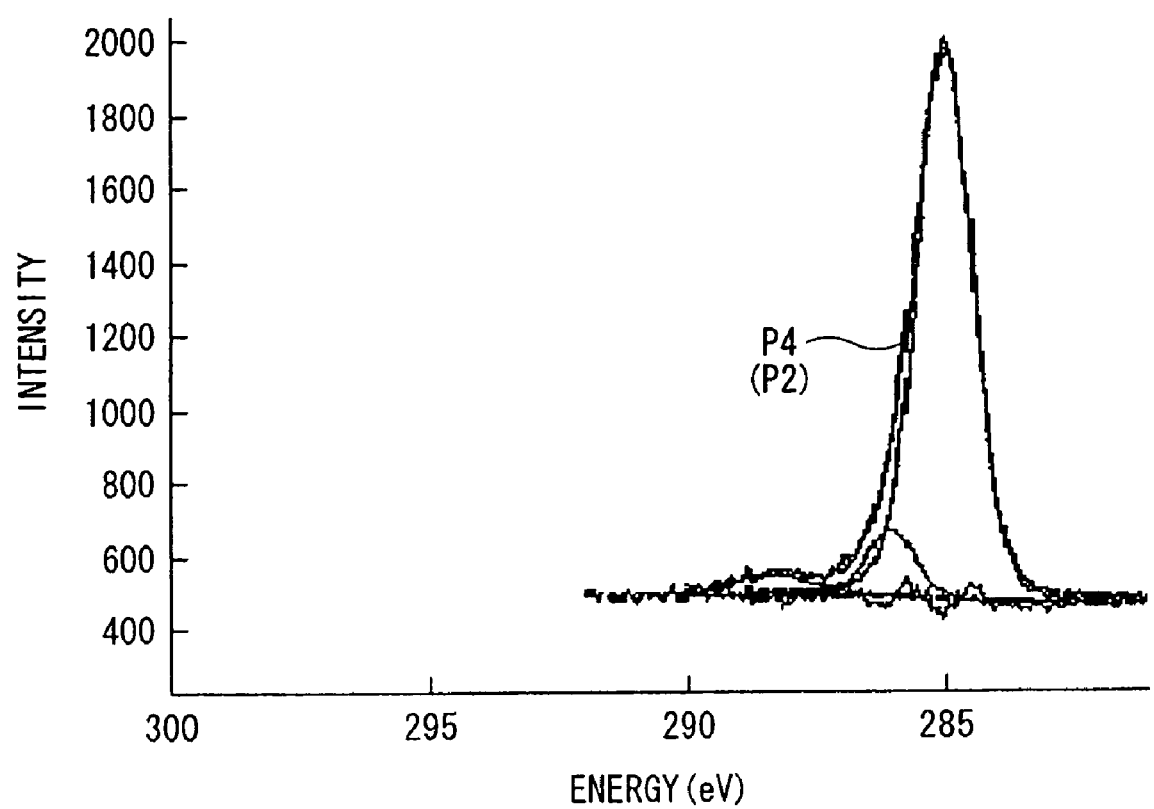
FIG. 11 shows an example of peaks obtained by X-ray photoelectron spectroscopy according to anode active materials formed in Comparative example.

For the obtained anode active materials of Examples 3-1, 3-2 and Comparative examples 3-1, 3-2, the composition was analyzed as in Examples 1-1 to 1-8. The results are shown in Table 5. Further, when XPS was performed and obtained peaks were analyzed, in Examples 3-1, 3-2 and Comparative example 3-2, as in Examples 1-1 to 1-8, the peak P2 of surface contamination carbon and the peak P3 of C1s in the anode active material were obtained. The peak P3 was obtained in the region lower than 284.5 eV for every case. That is, it was confirmed that at least part of carbon contained in the anode active material was bonded to other element. Meanwhile, in Comparative example 3-1, as shown in FIG. 11, a peak P4 was obtained. When the peak P4 was analyzed, only the peak P2 of the surface contamination carbon was obtained. Further, for Examples 3-1 and 3-2, as in Examples 1-1 to 1-8, the peak intensity originated in cobalt as the first neighboring atom in the radial structure function around tin and the coordination number of cobalt as the first neighboring atom around tin obtained by the radial structure function calculated based on one scattering theory of X-ray absorption spectroscopy were obtained. The results were 5.2 $Å^{-4}$ or less and 4 or less,

TABLE 5

|  | Raw material ratio (wt %) | | | | Analytical value (wt %) | | | | Discharge capacity ($mAh/cm^3$) | Capacity retention ratio at the 300th cycle (%) |
|---|---|---|---|---|---|---|---|---|---|---|
|  | Co | Sn | C | Ti | Co | Sn | C | Ti | | |
| Example 3-1 | 31.8 | 54.2 | 10.0 | 4.0 | 30.5 | 53.6 | 9.9 | 4.0 | 143 | 81 |
| Example 1-1 | 28.1 | 47.9 | 20.0 | 4.0 | 27.8 | 47.7 | 19.8 | 4.0 | 146 | 83 |
| Example 3-2 | 24.4 | 41.6 | 30.0 | 4.0 | 24.2 | 41.2 | 29.7 | 4.0 | 144 | 80 |
| Comparative example 3-1 | 35.5 | 60.5 | 0 | 4.0 | 35.1 | 59.9 | 0 | 4.0 | 98 | 0 |
| Comparative example 3-2 | 20.7 | 35.3 | 40.0 | 4.0 | 20.5 | 34.9 | 39.6 | 4.0 | 113 | 21 |

Co/(Sn + Co) = 37 wt % respectively. Furthermore, for the secondary batteries as well, as in Examples 1-1 to 1-8, charge and discharge were performed, and the discharge capacity at the second cycle and cycle characteristics were measured. The results are shown in Table 5. For the cycle characteristics, the discharge capacity retention ratio at the 300th cycle to the discharge capacity at the second cycle was obtained. Further, for the secondary battery of Example 1-1 as well, the discharge capacity retention ratio at the 300th cycle to the discharge capacity at the second cycle was obtained. The results are also shown in table 5 together.

As evidenced by Table 5, according to Examples 3-1 and 3-2, in which the coordination number of cobalt as the first neighboring atom around tin obtained by the radial structure function calculated based on one scattering theory of X-ray absorption spectroscopy was 4 or less and the peak intensity originated in cobalt as the first neighboring atom in the radial structure function around tin was 5.2 Å$^{-4}$ or less, and carbon was contained in the range from 9.9 wt % to 29.7 wt %, higher values of the discharge capacity and the capacity retention ratio were obtained compared to in Comparative examples 3-1 and 3-2, in which the carbon content was out of the foregoing range.

That is, it was found that when the carbon content in the anode active material was from 9.9 wt % to 29.7 wt %, the capacity and cycle characteristics could be improved. Further, it was found that when the coordination number of cobalt as the first neighboring atom around tin obtained by the radial structure function calculated based on one scattering theory of X-ray absorption spectroscopy was 4 or less and the peak intensity originated in cobalt as the first neighboring atom in the radial structure function around tin was 5.2 Å$^{-4}$ or less, cycle characteristics could be more improved.

Examples 4-1 to 4-3

Anode active materials and secondary batteries were formed as in Example 1-1, except that the raw material ratio of cobalt, tin, carbon, and titanium was changed as shown in Table. 6. Specifically, the raw material ratio of carbon was set to a constant value, 20 wt %, the Co/(Sn+Co) ratio was set to 30 wt %, 60 wt %, and 70 wt %.

was analyzed as in Examples 1-1 to 1-8. The results are shown in Table 6. Further, when XPS was performed and obtained peaks were analyzed, as in Examples 1-1 to 1-8, the peak P2 of surface contamination carbon and the peak P3 of C1s in the anode active material were obtained. The peak P3 was obtained in the region lower than 284.5 eV for every case. That is, it was confirmed that at least part of carbon contained in the anode active material was bonded to other element. Further, for Examples 4-1 to 4-3, as in Examples 1-1 to 1-8, the peak intensity originated in cobalt as the first neighboring atom in the radial structure function around tin and the coordination number of cobalt as the first neighboring atom around tin obtained by the radial structure function calculated based on one scattering theory of X-ray absorption spectroscopy were obtained. The results were 5.2 Å$^{-4}$ or less and 4 or less, respectively. Furthermore, for the secondary batteries as well, as in Examples 1-1 to 1-8, charge and discharge were performed, and the discharge capacity at the second cycle and cycle characteristics were measured. The results are shown in Table 6. For the cycle characteristics, the discharge capacity retention ratio at the 300th cycle to the discharge capacity at the second cycle was obtained.

As evidenced by Table 6, according to Examples 4-1 to 4-3, in which the coordination number of cobalt as the first neighboring atom around tin obtained by the radial structure function calculated based on one scattering theory of X-ray absorption spectroscopy was 4 or less, the peak intensity originated in cobalt as the first neighboring atom in the radial structure function around tin was 5.2 Å$^{-4}$ or less, and the Co/(Sn+Co) ratio was in the range from 30 wt % to 70 wt %, higher values of the initial discharge capacity and the capacity retention ratio were obtained compared to in Comparative examples 4-1 and 4-2, in which the Co/(Sn+Co) ratio was out of the range, which was from 30 wt % to 70 wt %. In particular, when the ratio of Co/(Sn+Co) ratio was 60 wt % or less, a high initial charge capacity was obtained.

That is, it was found that when the Co/(Sn+Co) ratio in the anode active material was from 30 wt % to 70 wt %, the capacity and cycle characteristics could be improved. Further, it was found that when the coordination number of cobalt as the first neighboring atom around tin obtained by the radial structure function calculated based on one scattering theory

TABLE 6

| | Raw material ratio (wt %) | | | | Analytical value (wt %) | | | | Co/ (Sn + Co) | Discharge capacity (mAh/cm$^3$) | Capacity retention ratio at the 300th cycle (%) |
|---|---|---|---|---|---|---|---|---|---|---|---|
| | Co | Sn | C | Ti | Co | Sn | C | Ti | | | |
| Example 4-1 | 22.8 | 53.2 | 20.0 | 4.0 | 22.6 | 52.6 | 19.8 | 4.0 | 30 | 147 | 80 |
| Example 1-1 | 28.1 | 47.9 | 20.0 | 4.0 | 27.8 | 47.4 | 19.8 | 4.0 | 37 | 146 | 83 |
| Example 4-2 | 45.6 | 30.4 | 20.0 | 4.0 | 45.1 | 30.1 | 19.8 | 4.0 | 60 | 145 | 85 |
| Example 4-3 | 53.2 | 22.8 | 20.0 | 4.0 | 52.6 | 22.6 | 19.8 | 4.0 | 70 | 144 | 88 |
| Comparative example 4-1 | 21.3 | 54.7 | 20.0 | 4.0 | 21.1 | 54.1 | 19.8 | 4.0 | 28 | 147 | 65 |
| Comparative example 4-2 | 57.0 | 19.0 | 20.0 | 4.0 | 56.4 | 18.8 | 19.8 | 4.0 | 75 | 130 | 90 |

As Comparative examples 4-1 and 4-2 relative to Examples 4-1 to 4-3, anode active materials and secondary batteries were formed as in Examples 4-1 and 4-2, except that the Co/(Sn+Co) ratio was 28 wt % or 70 wt %.

For the obtained anode active materials of Examples 4-1 to 4-3 and Comparative examples 4-1 and 4-2, the composition of X-ray absorption spectroscopy was 4 or less and the peak intensity originated in cobalt as the first neighboring atom in the radial structure function around tin was 5.2 Å$^{-4}$ or less, cycle characteristics could be more improved. Further, it was found that the Co/(Sn+Co) ratio was preferably 60 wt % or less.

Examples 5-1 to 5-8

Anode active materials and secondary batteries were formed as in Examples 1-1 to 1-8, except that the raw material ratio of cobalt, tin, carbon, and titanium was changed as shown in Table 7. Specifically, the raw material ratio of titanium was changed in the range from 1.2 wt % to 15 wt %, and the Co/(Sn+Co) ratio was set to a constant value, 35 wt %, and the raw material ratio of carbon was set to a constant value, 20 wt %.

TABLE 7

|  | Raw material ratio (wt %) | | | | Analytical value (wt %) | | | | Discharge capacity (mAh/cm$^3$) | Capacity retention ratio at the 300th cycle (%) |
| --- | --- | --- | --- | --- | --- | --- | --- | --- | --- | --- |
|  | Co | Sn | C | Ti | Co | Sn | C | Ti | | |
| Example 5-1 | 27.6 | 51.2 | 20 | 1.2 | 27.3 | 50.7 | 19.8 | 1.2 | 143 | 73 |
| Example 5-2 | 27.2 | 50.4 | 20 | 2.4 | 26.9 | 49.9 | 19.8 | 2.4 | 145 | 80 |
| Example 5-3 | 26.6 | 49.4 | 20 | 4.0 | 26.3 | 48.9 | 19.8 | 4.0 | 147 | 83 |
| Example 5-4 | 26.2 | 48.7 | 20 | 5.1 | 26.0 | 48.2 | 19.8 | 5.0 | 147 | 85 |
| Example 5-5 | 25.4 | 47.1 | 20 | 7.5 | 25.1 | 46.7 | 19.8 | 7.4 | 148 | 84 |
| Example 5-6 | 24.5 | 45.5 | 20 | 10.0 | 24.3 | 45.0 | 19.8 | 9.9 | 147 | 85 |
| Example 5-7 | 23.5 | 43.6 | 20 | 13.0 | 23.2 | 43.1 | 19.8 | 12.9 | 143 | 84 |
| Example 5-8 | 22.8 | 42.3 | 20 | 15.0 | 22.5 | 41.8 | 19.8 | 14.9 | 140 | 79 |
| Comparative example 5-1 | 28.0 | 52.0 | 20 | 0 | 27.7 | 51.5 | 19.8 | 0 | 140 | 70 |
| Comparative example 5-2 | 22.4 | 41.6 | 20 | 16.0 | 22.2 | 41.2 | 19.8 | 15.8 | 130 | 69 |

Co/(Sn + Co) = 35 wt %

As Comparative example 5-1 relative to Examples 5-1 to 5-8, an anode active material and a secondary battery were formed as in Examples 5-1 to 5-8, except that titanium powder was not used as a raw material. Further, as Comparative example 5-2, an anode active material and a secondary battery were formed as in Examples 5-1 to 5-8, except that the raw material ratio of titanium was 16 wt %.

For the obtained anode active materials of Examples 5-1 to 5-8 and Comparative examples 5-1, 5-2, the composition was analyzed as in Examples 1-1 to 1-8. The results are shown in Table 7. Further, when XPS was performed and obtained peaks were analyzed, as in Examples 1-1 to 1-8, the peak P2 of surface contamination carbon and the peak P3 of C1s in the anode active material were obtained. The peak P3 was obtained in the region lower than 284.5 eV for every case. That is, it was confirmed that at least part of carbon contained in the anode active material was bonded to other element. Further, for Examples 5-1 to 5-8, as in Examples 1-1 to 1-8, the peak intensity originated in cobalt as the first neighboring atom in the radial structure function around tin and the coordination number of cobalt as the first neighboring atom around tin obtained by the radial structure function calculated based on one scattering theory of X-ray absorption spectroscopy were obtained. The results were 5.2 Å$^{-4}$ or less and 4 or less, respectively. Furthermore, for the secondary batteries as well, as in Examples 1-1 to 1-8, charge and discharge were performed, and the discharge capacity at the second cycle and cycle characteristics were measured. The results are shown in Table 7 and FIG. 12. For the cycle characteristics, the discharge capacity retention ratio at the 300th cycle to the discharge capacity at the second cycle was obtained.

Figure 12:
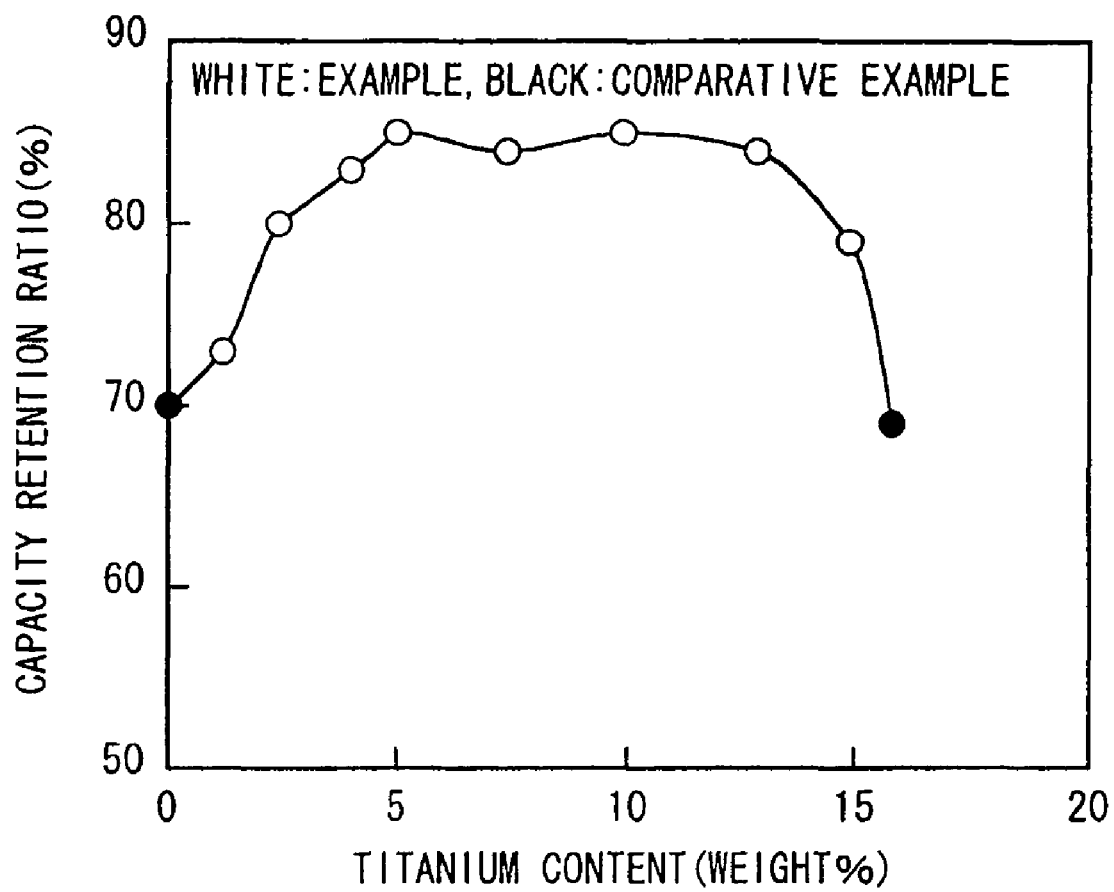
FIG. 12 is a characteristics view showing a relation between the titanium content in the anode active material and the capacity retention ratio.

As evidenced by Table 7 and FIG. 12, according to Examples 5-1 to 5-8, in which the coordination number of cobalt as the first neighboring atom around tin obtained by the radial structure function calculated based on one scattering theory of X-ray absorption spectroscopy was 4 or less, the peak intensity originated in cobalt as the first neighboring atom in the radial structure function around tin was 5.2 Å$^{-4}$ or less, and titanium was contained in the range from 14.9 wt % or less, the capacity retention ratio could be improved than in Comparative example 5-1 not including titanium or Comparative example 5-2, in which the titanium content was over 14.9 wt %. Further, when the titanium content was 2.4 wt % or more, particularly in the range from 4.0 wt % to 12.9 wt %, higher values were obtained.

That is, it was found that when at least one from the group consisting of indium, niobium, germanium, titanium, molybdenum, aluminum, phosphorus, and bismuth was contained in the anode active material as a fourth element in the range of 14.9 wt % or less, cycle characteristics could be more improved. Further, it was found that when the coordination number of cobalt as the first neighboring atom around tin obtained by the radial structure function calculated based on one scattering theory of X-ray absorption spectroscopy was 4 or less and the peak intensity originated in cobalt as the first neighboring atom in the radial structure function around tin was 5.2 Å$^{-4}$ or less, cycle characteristics could be more improved. Further, it was found that the content of the fourth element was more preferably 2.4 wt % or more, in particular much more preferably in the range from 4.0 wt % to 12.9 wt %.

The present invention has been described with reference to the embodiment and the examples. However, the present invention is not limited to the embodiment and the examples, and various modifications may be made. For example, in the foregoing embodiment and examples, descriptions have been given with reference to the sheet-type secondary battery and the secondary battery having the winding structure. However, the present invention can be similarly applied to a secondary battery having other shape and using an package member such as a coin-type battery, a button-type battery, and a square-type battery, or a secondary battery having a laminated structure, in which a cathode and an anode are layered a plurality of times.

Further, in the foregoing embodiment and examples, descriptions have been given of the case using lithium as an electrode reactant. However, as long as reactive to the anode active material, when other element of Group 1 in the long period periodic table such as sodium (Na) and potassium (K), an element of Group 2 in the long period periodic table such as magnesium and calcium (Ca), other light metal such as aluminum, lithium, or an alloy thereof is used, the present invention can be applied as well, and similar effects can be obtained. At this time, a cathode active material capable of inserting and extracting electrode reactant, a nonaqueous solvent or the like is selected according to the electrode reactant.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An anode active material, wherein tin (Sn), cobalt (Co), carbon (C), and a fourth element are contained as an element,
    the carbon content is from 9.9 wt % to 29.7 wt %, and the ratio of cobalt to the total of tin and cobalt is from 30 wt % to 70 wt %,
    the fourth element is at least one from the group consisting of indium (In), niobium (Nb), germanium (Ge), titanium (Ti), molybdenum (Mo), aluminum (Al), phosphorus (P), and bismuth (Bi), and the content thereof is 14.9 wt % or less, and
    the coordination number of cobalt as a first neighboring atom around tin obtained by the radial structure function calculated based on one scattering theory of X-ray absorption spectroscopy is 4 or less.

2. An anode active material according to claim 1, wherein the peak intensity originated in cobalt as the first neighboring atom in the radial structure function around tin is 5.2 Å$^4$ or less.

3. A battery comprising:
    a cathode;
    an anode; and
    an electrolyte,
    wherein the anode contains an anode active material containing tin (Sn), cobalt (Co), carbon (C), and a fourth element as an element,
    the carbon content in the anode active material is from 9.9 wt % to 29.7 wt %, and the ratio of cobalt to the total of tin and cobalt is from 30 wt % to 70 wt %,
    the fourth element is at least one from the group consisting of indium (In), niobium (Nb), germanium (Ge), titanium (Ti), molybdenum (Mo), aluminum (Al), phosphorus (P), and bismuth (Bi), and the content thereof is 14.9 wt % or less, and
    the coordination number of cobalt as a first neighboring atom around tin obtained by the radial structure function calculated based on one scattering theory of X-ray absorption spectroscopy is 4 or less.

4. A battery according to claim 3, wherein the peak intensity originated in cobalt as the first neighboring atom in the radial structure function around tin is 5.2 Å$^{-4}$ or less.

5. A battery according to claim 4, wherein the ratio of the peak intensity after 50 cycles to a given state is 0.84 or more.

* * * * *